United States Patent
Yasui

(10) Patent No.: US 10,520,051 B2
(45) Date of Patent: Dec. 31, 2019

(54) ELECTRIC BRAKING DEVICE FOR VEHICLE

(71) Applicant: ADVICS CO., LTD., Kariya-shi, Aichi-ken (JP)

(72) Inventor: Yoshiyuki Yasui, Nagoya (JP)

(73) Assignee: ADVICS CO., LTD., Kariya-Shi, Aichi (JP)

( * ) Notice: Subject to any disclaimer, the term of this patent is extended or adjusted under 35 U.S.C. 154(b) by 14 days.

(21) Appl. No.: 16/064,045

(22) PCT Filed: Dec. 21, 2016

(86) PCT No.: PCT/JP2016/088073
§ 371 (c)(1),
(2) Date: Jun. 20, 2018

(87) PCT Pub. No.: WO2017/110860
PCT Pub. Date: Jun. 29, 2017

(65) Prior Publication Data
US 2019/0003536 A1 Jan. 3, 2019

(30) Foreign Application Priority Data

Dec. 22, 2015 (JP) .................................. 2015-249631

(51) Int. Cl.
*B60T 13/74* (2006.01)
*F16D 63/00* (2006.01)
(Continued)

(52) U.S. Cl.
CPC ............ *F16D 63/002* (2013.01); *B60T 1/005* (2013.01); *B60T 7/042* (2013.01); *B60T 7/12* (2013.01);
(Continued)

(58) Field of Classification Search
CPC .. B60T 7/042; B60T 7/12; B60T 7/122; B60T 13/02; B60T 13/741; B60T 13/745;
(Continued)

(56) References Cited

U.S. PATENT DOCUMENTS 6,607,253 B1 * 8/2003 Yamamoto ............... B60T 7/042
188/181 T
9,604,622 B2 * 3/2017 Yasui ....................... B60T 17/22
(Continued)

FOREIGN PATENT DOCUMENTS

JP   H10-267053 A   10/1998
JP   2015-107745 A   6/2015

OTHER PUBLICATIONS

International Search Report (PCT/ISA/210) dated Mar. 7, 2017, by the Japanese Patent Office as the International Searching Authority for International Application No. PCT/JP2016/088073.
(Continued)

*Primary Examiner* — Christopher P Schwartz
(74) *Attorney, Agent, or Firm* — Buchanan Ingersoll & Rooney PC

(57) ABSTRACT

A vehicular electrical braking device equipped with a control means for driving an electric motor and a lock mechanism, the electric motor pressing a friction member against a rotary member, and the lock mechanism applying parking brake. The control means comprises steps of: calculating an instruction pressure force on the basis of the amount of brake operation; calculating a parking pressure force on the basis of a parking signal; determining as a target pressure force the greater one of the instruction pressure force and the parking pressure force; adjusting the amount of power to be applied to the electrical motor such that an actual pressure force matches the target pressure force on the basis of the target pressure force and the actual pressure force; and controlling
(Continued)

the operation of the lock mechanism on the basis of the actual pressure force.

1 Claim, 10 Drawing Sheets

(51) Int. Cl.
| | |
|---|---|
| *B60T 7/12* | (2006.01) |
| *B60T 8/17* | (2006.01) |
| *F16D 65/18* | (2006.01) |
| *B60T 8/1761* | (2006.01) |
| *F16D 65/22* | (2006.01) |
| *B60T 1/00* | (2006.01) |
| *B60T 7/04* | (2006.01) |
| *F16D 55/226* | (2006.01) |
| *F16D 121/24* | (2012.01) |
| *F16D 127/06* | (2012.01) |
| *F16D 125/40* | (2012.01) |

(52) U.S. Cl.
CPC .............. *B60T 8/17* (2013.01); *B60T 8/17613* (2013.01); *B60T 13/741* (2013.01); *B60T 13/745* (2013.01); *F16D 55/226* (2013.01); *F16D 63/006* (2013.01); *F16D 65/18* (2013.01); *F16D 65/183* (2013.01); *F16D 65/22* (2013.01); *F16D 2121/24* (2013.01); *F16D 2125/40* (2013.01); *F16D 2127/06* (2013.01)

(58) Field of Classification Search
CPC .......... B60T 17/22; B60T 17/74; F16D 65/18; F16D 65/22; F16D 65/62
USPC ............. 303/3, 15, 20, 112, 155; 701/70, 72
See application file for complete search history.

(56) References Cited

U.S. PATENT DOCUMENTS

2004/0104618 A1* 6/2004 Yamamoto .............. B60T 7/042
303/20
2016/0031427 A1* 2/2016 Yasui ...................... B60T 17/22
701/70

OTHER PUBLICATIONS

Written Opinion (PCT/ISA/237) dated Mar. 7, 2017, by the Japanese Patent Office as the International Searching Authority for International Application No. PCT/JP2016/088073.

* cited by examiner

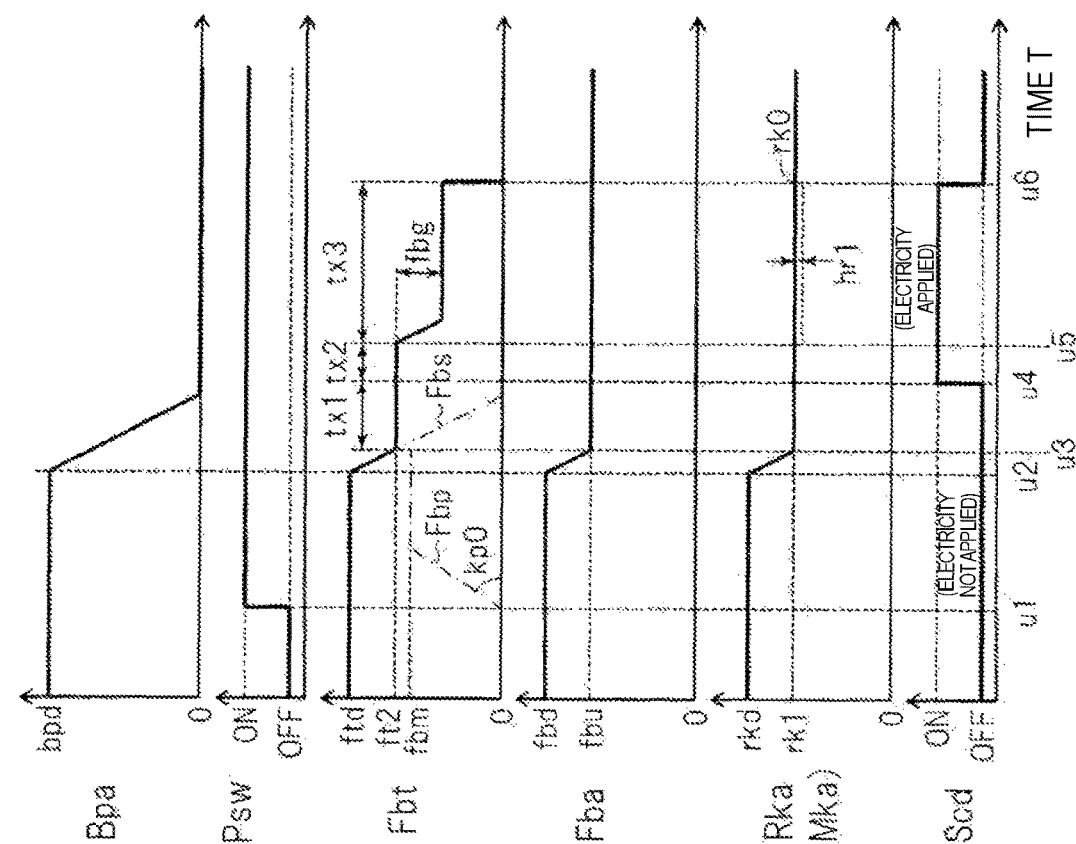
FIG. 10A WHEN Fba IS LESS THAN LOWER VALUE fbs AT THE TIME PSW IS TURNED ON
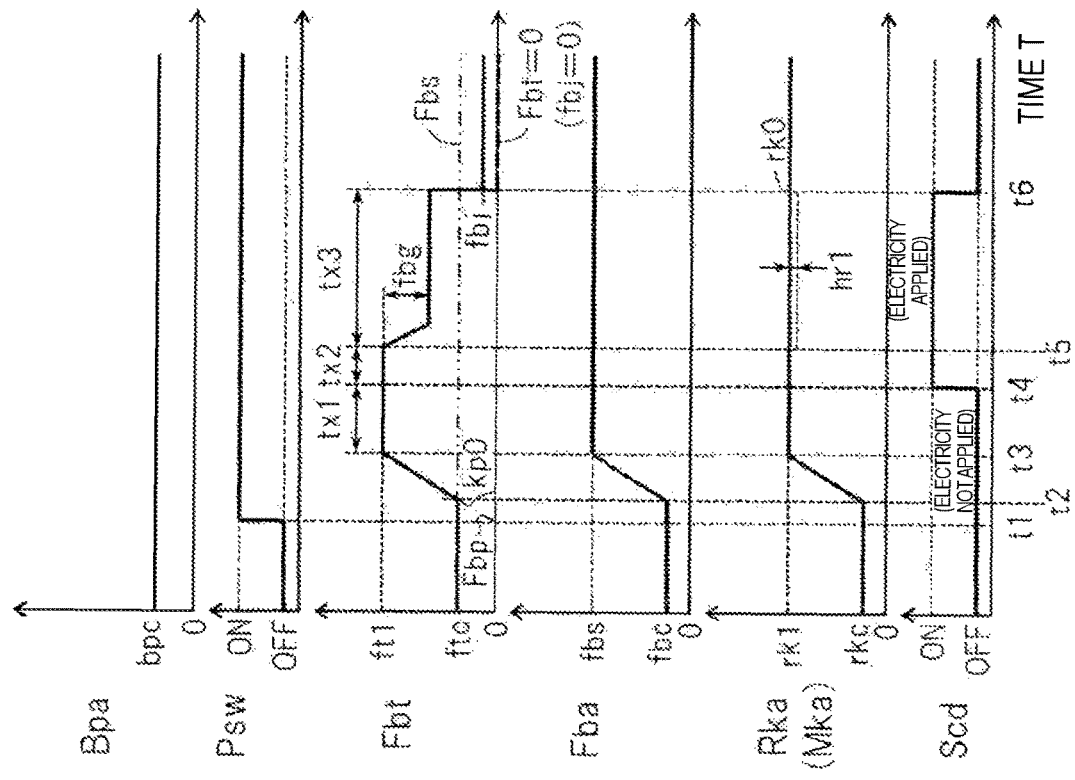
FIG. 10B WHEN Fba IS LARGER THAN VALUE fbu (≥ fbs) AT THE TIME PSW IS TURNED ON

ELECTRIC BRAKING DEVICE FOR VEHICLE

TECHNICAL FIELD

The present invention relates to an electric braking device for a vehicle.

BACKGROUND ART

Patent Literature 1 describes a "drum-in-disk brake device that integrally forms a brake disk rotor with a brake drum, in which braking is performed by a disk brake device during running and braking is performed by a drum brake device during parking". In such a brake device, a service brake and a parking brake are operated independently, and thus the service brake and the parking brake do not interfere with each other.

The applicant develops an electric braking device in which service braking (braking performed by a driver's operation to step on a brake pedal) and parking braking (braking to maintain a halted state of a vehicle) are performed by a single electric motor, as described for example in Patent Literature 2. Here, the parking brake exhibits its function by restraining a motion of an electric motor MTR by a lock mechanism LOK configured of a ratchet wheel RCH and a hook member TSU. Moreover, to suppress interference between the service brake and the parking brake in the control of the electric motor MTR, larger one of a service brake target value Ims and a parking brake target value Ipk is selected as a final target value Imt by a selecting means SNT in determining a target electricity amount of the electric motor MTR.

In the electric braking device of Patent Literature 2, a situation will be assumed in which a driver switches a parking brake switch (parking switch) PSW from an off state to an on state under a state in which the driver is operating a braking operation member (brake pedal) BP at an excessively strong degree. In this case, an unnecessarily excessive force is applied to a caliper against a retaining force that maintains the halted state of the vehicle. Thus, strength of the caliper must be sufficiently ensured, which may bring forth size and weight increases in the electric braking device.

Further, as described in Patent Literature 2, in a case where the control of the electric motor is adjusted at a level of the target electricity amount (at a calculation stage), a force Fba by which a friction member MSB presses a rotary member KTB is affected by a power transmission efficiency from the electric motor MTR to the friction member MSB. For example, in a case where a viscosity of lubricant becomes high in an extremely low temperature and the power transmission efficiency is thereby reduced, a delay may be generated in the operation (engagement operation or release operation) of the parking brake.

CITATIONS LIST

Patent Literatures

Patent Literature 1: JP H10-267053 A
Patent Literature 2: JP 2015-107745 A

SUMMARY OF INVENTION

Technical Problems

An aim of the present invention is to provide an electric braking device configured of one electric motor in a vehicle wheel, which prevents control interference between a service brake and a parking brake, and capable of reducing size and weight of the device as a whole, and in addition which is capable of suitably performing an operation of the parking brake even in a case where a change occurs in an efficiency.

Solutions to Problems

An electric braking device for a vehicle according to the present invention includes: an electric motor (MTR) configured to press a friction member (MSB) onto a rotary member (KTB), which rotates integrally with a vehicle wheel (WHL) of the vehicle, in accordance with an operation amount (Bpa) of a braking operation member (BP) by a driver of the vehicle; a lock mechanism (LOK) configured to effectuate a parking brake in the vehicle by locking rotation of the electric motor (MTR) in accordance with a signal (Psw) of a parking switch (PSW) operated by the driver of the vehicle; a pressing force acquiring means (FBA) configured to acquire an actual pressing force (Fba) by which the friction member (MSB) presses the rotary member (KTB); and a control means (CTL) configured to drive the electric motor (MTR) and the lock mechanism (LOK).

In the electric braking device for a vehicle according to the present invention, the control means (CTL) is configured to: calculate an instruction pressing force (Fbs) for the friction member (MSB) to press the rotary member (KTB) based on the operation amount (Bpa); calculate a parking pressing force (Fbp) for the friction member (MSB) to press the rotary member (KTB) based on a parking signal (Psw) from the parking switch (PSW); determine larger one of the instruction pressing force (Fbs) and the parking pressing force (Fbp) as a target pressing force (Fbt); adjust an amount of electricity (Imt, Ima) supplied to the electric motor (MTR) based on the target pressing force (Fbt) and the actual pressing force (Fba) such that the actual pressing force (Fba) matches the target pressing force (Fbt); and control an operation of the lock mechanism (LOK) based on the actual pressing force (Fba).

The electric motor MTR generates output torque according to its amount of electricity. Thus, in a case where a transmission efficiency of a braking means BRK is reduced, a pressing force generated by the braking means BRK decreases as compared to a case where the transmission efficiency is high. According to this configuration, the larger one of the instruction pressing force Fbs and the parking pressing force Fbp is determined as the target pressing force Fbt, and the electricity amount Imt, Ima supplied to the electric motor MTR is adjusted based on the target pressing force Fbt and the actual pressing force Fba such that the actual pressing force Fba matches the target pressing force Fbt. Due to this, operation and release of a parking brake can be performed without delay even if the efficiency drop occurs in the braking means BRK in a situation where a service brake control by a driver's braking operation is prioritized over a parking brake control (that is, control interference is prevented).

BRIEF DESCRIPTION OF DRAWINGS

FIGS. 10A and 10B are time-series diagrams for explaining the processes of the engagement operation and the electricity amount limiting process in the parking brake control.

DESCRIPTION OF EMBODIMENTS

Hereinbelow, an electric braking device for a vehicle according to an embodiment of the present invention will be described with reference to the drawings.

<Overall Configuration of Electric Braking Device for Vehicle According to an Embodiment of the Present Invention>

Figure 1:
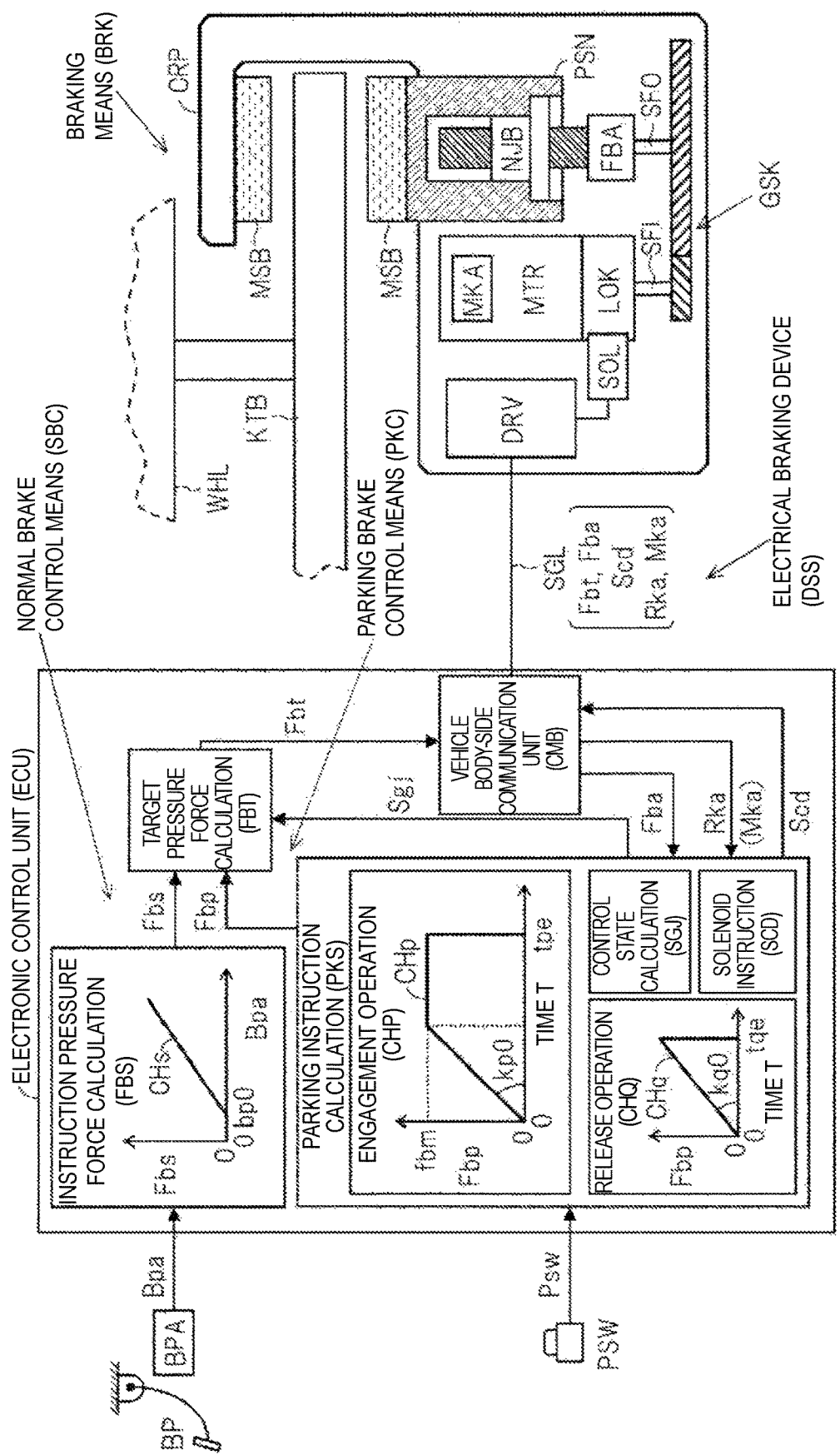
FIG. 1 is an overall configuration diagram of an electric braking device for a vehicle according to an embodiment of the present invention.

An electric braking device DSS according to an embodiment of the present invention will be described with reference to an overall configuration diagram of FIG. 1. A vehicle is provided with the electric braking device DSS, a braking operation member BP, an operation amount acquiring means BPA, a parking brake switch PSW, a rotary member (for example, a brake disk or a brake drum) KTB, and friction members (for example, brake pads or brake shoes) MSB. The electric braking device DSS is configured of an electronic control unit ECU, a communication line SGL, and a braking means BRK.

The braking operation member (for example, a brake pedal) BP is a member that a driver operates to decelerate the vehicle. Braking torque of a vehicle wheel WHL is adjusted by the braking means BRK according to the operation of the braking operation member BP. As a result, a braking force is generated in the vehicle wheel WHL, and the running vehicle is thereby decelerated.

The braking operation member BP is provided with the operation amount acquiring means BPA. The operation amount acquiring means BPA allows an operation amount (braking operation amount) Bpa of the braking operation member BP to be acquired (detected). As the operation amount acquiring means BPA, at least one of a sensor (pressure sensor) that detects a pressure of a master cylinder, a sensor (pedaling sensor) that detects an operation force on the braking operation member BP, and a sensor (stroke sensor) that detects an operation displacement of the braking operation member BP is employed. Thus, the braking operation amount Bpa is calculated based on at least one of the master cylinder pressure, the brake pedaling force, and the brake pedal stroke. The detected braking operation amount Bpa is input to the electronic control unit ECU.

The parking brake switch (which may simply be termed a parking switch) PSW is a switch operated by the driver, and outputs an on or off signal Psw (termed a parking signal) to the electronic control unit ECU. That is, the driver instructs operation or release of the parking brake for maintaining a halted state of the vehicle by operating the parking switch PSW. Specifically, the operation of the parking brake is instructed by an on (ON) state of the parking signal Psw, and the release of the parking brake is instructed by an off (OFF) state of the parking signal Psw.

<<Electronic Control Unit ECU>>

The electronic control unit ECU is configured of an instruction pressing force calculation block FBS, a parking instruction calculation block PKS, a target pressing force calculation block FBT, and a vehicle body-side communication unit CMB. Here, those related to the service brake for decelerating the vehicle to stop (the instruction pressing force calculation block FBS and the target pressing force calculation block FBT) are termed a "service brake control means SBC", and those related to the parking brake for maintaining the halted state of the vehicle (the parking instruction calculation block PKS and the target pressing force calculation block FBT) are termed a "parking brake control means PKC". The electronic control unit ECU corresponds to a part of a control means (controller) CTL.

In the instruction pressing force calculation block FBS (corresponding to the service brake control means SBC), a target value (instruction pressing force) Fbs related to a force by which the friction members MSB press the rotary member KTB (pressing force) is calculated. Specifically, the instruction pressing force Fbs is calculated based on the braking operation amount Bpa and a preset calculation map CHs so that the instruction pressing force Fbs exhibits a monotonic increase from zero as the braking operation amount Bpa increases. Here, the instruction pressing force Fbs is a target value in a service brake function, and is input from the instruction pressing force calculation block FBS to the target pressing force calculation block FBT.

In the parking instruction calculation block PKS (corresponding to the parking brake control means PKC), a parking pressing force Fbp, an instruction signal Scd, and a control state Sgj are calculated based on the signal (parking signal) Psw from the parking switch PSW, an actual pressing force Fba, and a ratchet wheel rotation angle (which may simply be termed a gear rotation angle) Rka. The parking instruction calculation block PKS is configured of an engagement operation block CHP, a release operation block CHQ, a solenoid instruction block SCD, and a control state calculation block SGJ. As will be described later, a detection result (motor rotation angle) Mka from a motor rotation angle detecting means MKA may be employed as the gear rotation angle Rka.

In the engagement operation block CHP, the parking pressing force Fbp is calculated based on a preset characteristic CHp with a time point when the parking signal Psw has shifted from the off state to the on state (calculation cycle) as a starting point (from a point of time T=0), based on the parking signal Psw. The parking pressing force Fbp calculated in the engagement operation block CHP is a target value for the pressing force to effectuate the parking brake. Specifically, the parking pressing force Fbp is output such that it increases monotonically at a time gradient kp0 as time elapses and reaches an upper limit value fbm. Here, the upper limit value fbm is set with consideration to a power transmission efficiency in the brake actuator BRK to ensure that the actual pressing force Fba becomes larger than an upper value fbu to be described later. Then, the parking pressing force Fbp is brought to zero at a time point tpe when the engagement operation is completed.

In the release operation block CHQ, the parking pressing force Fbp is calculated based on a preset characteristic CHq with a time point when the parking signal Psw has shifted from the on state to the off state (calculation cycle) as a starting point (from a point of time T=0), based on the parking signal Psw. The parking pressing force Fbp calculated in the release operation block CHQ is a target value of the pressing force for releasing the parking brake. Specifically, the parking pressing force Fbp is output such that it increases monotonically at a time gradient kq0 as time elapses. Then, the parking pressing force Fbp is brought to zero at a time point tqe when the release operation is completed.

In the control state calculation block SGJ, the signal (control state) Sgj indicating a current operation state of the parking brake based on the parking signal Psw, the actual pressing force Fba, and the gear rotation angle Rka. In the solenoid instruction block SCD, the instruction signal Scd that instructs an electricity applied state of a solenoid SOL of the lock mechanism LOK is calculated based on the parking signal Psw, the actual pressing force Fba, and the gear rotation angle Rka. Details of the control state calculation block SGJ and the solenoid instruction block SCD will be described later (see FIGS. 5 and 7).

In the target pressing force calculation block FBT, the target pressing force Fbt is calculated based on the instruction pressing force Fbs and the parking pressing force Fbp. Specifically, larger one of the instruction pressing force Fbs and the parking pressing force Fbp is determined to be the target pressing force Fbt. Here, the target pressing force Fbt is a final target value of the pressing force. In the target pressing force calculation block FBT, a restriction may be applied to the target pressing force Fbt based on the control state Sgj. In a case where the control state Sgj instructs an engagement maintaining state, the target pressing force Fbt is restricted to a restriction pressing force (preset predetermined value) fbj. For example, the restriction pressing force fbj is set to zero. In this case, when the operating state of the parking brake is in the engagement maintaining state, the target pressing force Fbt is set to zero even if the braking operation member BP is operated and the braking operation amount Bpa is increased, and thus electricity application to the electric motor MTR does not take place. Power consumption of the electric motor MTR may be suppressed by this restriction process.

The target pressing force Fbt and the instruction signal Scd are input to the vehicle body-side communication unit CMB. In the vehicle body-side communication unit CMB, signal transmission and reception are performed with a driving means DRV (especially a vehicle wheel-side communication unit CMW) in the braking means BRK via the communication line SGL. The target pressing force Fbt and the solenoid instruction signal Scd are sent from the vehicle body-side communication unit CMB to the vehicle wheel-side communication unit CMW. The actual pressing force Fba, the ratchet wheel rotation angle Rka, and the electric motor rotation angle Mka are sent from the vehicle wheel-side communication unit CMW to the vehicle body-side communication unit CMB.

The communication line SGL is a communication means between the electronic control unit ECU fixed to a vehicle body and the braking means BRK fixed to the vehicle wheel. A serial communication bus (for example, a CAN bus) may be employed as the signal line SGL.

<<Braking Means (Brake Actuator) BRK>>

The braking means BRK is provided on a vehicle wheel WHL side, and is configured to apply braking torque to the vehicle wheel WHL to generate a braking force. The vehicle that is running is decelerated by the braking means BRK (that is, it functions as the service brake). Further, the braking means BRK functions as the parking brake for maintaining the halted state during when the vehicle is parked.

As the braking means BRK, a configuration of a so-called disk-type braking device (disk brake) is exemplified. In this case, the friction members MSB are brake pads and the rotary member KTB is a brake disk. The braking means BRK may be a drum-type braking device (drum brake). In a case of the drum brake, the friction members MSB are brake shoes and the rotary member KTB is a brake drum.

The braking means BRK (brake actuator) is configured of a brake caliper CRP, a pressing member PSN, the electric motor MTR, a position acquiring means MKA, a reduction gear GSK, an input member SFI, an output member SFO, a screw member NJB, a pressing force acquiring means FBA, a driving means DRV, and the parking brake lock mechanism LOK. The respective members as above (PSN and the like) are accommodated inside the brake caliper CRP.

As the brake caliper CRP (which may simply be termed a caliper), a floating type caliper may be employed. The caliper CRP is configured to hold the rotary member (brake disk) KTB by two friction members (brake pads) MSB. The pressing member (brake piston) PSN moves (forward or backward) relative to the rotary member KTB within the caliper CRP. The movement of the pressing member PSN causes the friction members MSB to be pressed against the rotary member KTB to generate a frictional force. The caliper CRP has a portion configured of a box structure. Specifically, the caliper CRP has an internal space (space), where various members (driving circuit DRV and the like) are accommodated therein.

The movement of the pressing member PSN is performed by power from the electric motor MTR. Specifically, an output of the electric motor MTR (rotational force about a motor shaft) is transmitted to the output member SFO via the reduction gear GSK. Then, a rotational force (torque) of the output member SFO is converted to a linear force (thrust force along an axial direction of the pressing member PSN) by the screw member NJB, and is transmitted to the pressing member PSN. As a result, the pressing member PSN is moved relative to the rotary member KTB. The force (pressing force) by which the friction members MSB press the rotary member KTB is adjusted by the movement of the pressing member PSN. Since the rotary member KTB is fixed to the vehicle wheel WHL, a frictional force is generated between the friction members MSB and the rotary member KTB, by which the braking force of the vehicle wheel WHL is adjusted.

The electric motor MTR is a power source for driving (moving) the pressing member PSN. For example, as the electric motor MTR, a motor with brush or a brushless motor may be employed. In a rotation direction of the electric motor MTR, a forward direction corresponds to a direction along which the friction members MSB approach the rotary member KTB (direction along which the pressing force increases and the braking torque increases), and a reverse direction corresponds to a direction along which the friction members MSB separate away from the rotary member KTB (direction along which the pressing force decreases and the braking torque decreases).

The position acquiring means (for example, a rotation angle sensor) MKA acquires (detects) the position (rotation angle) Mka of a rotor (rotator) of the electric motor MTR. The detected rotation angle Mka is input to the driving means DRV (specifically, a processor in the driving means DRV). The position acquiring means MKA also serves as a gear rotation angle acquiring means RKA to be described later. That is, the motor rotation angle Mka may be employed as the gear rotation angle Rka.

The pressing force acquiring means (for example, the pressing force sensor) FBA acquires (detects) a force (pressing force) Fba by which the pressing member PSN presses the friction members MSB. A detected actual pressing force Fba is input to the driving means DRV (specifically, the processor in the DRV). For example, the pressing force acquiring means FBA is provided between the output member SFO and the caliper CRP.

The driving means (driving circuit) DRV is an electric circuit configured to drive the electric motor MTR and the solenoid actuator SOL. The driving means DRV is configured of the processor (calculation processing device), a bridge circuit BRG, and the like. The driving means DRV controls the electric motor MTR based on the target electricity amount Imt, and the solenoid SOL is driven based on the instruction signal Scd.

The parking brake lock mechanism (which may simply be termed a lock mechanism) LOK locks the electric motor MTR in such a manner that the electric motor MTR does not rotate in a reverse direction for the brake function for maintaining the halted state of the vehicle (the so-called parking brake). The lock mechanism LOK restrains (restricts) the pressing member PSN from moving in a direction separating away from the rotary member KTB, and the pressing state of the rotary member KTB by the friction members MSB is thereby maintained. Here, the lock mechanism LOK may be provided between the electric motor MTR and the reduction gear GSK.

<Driving Means DRV>

Figure 2:
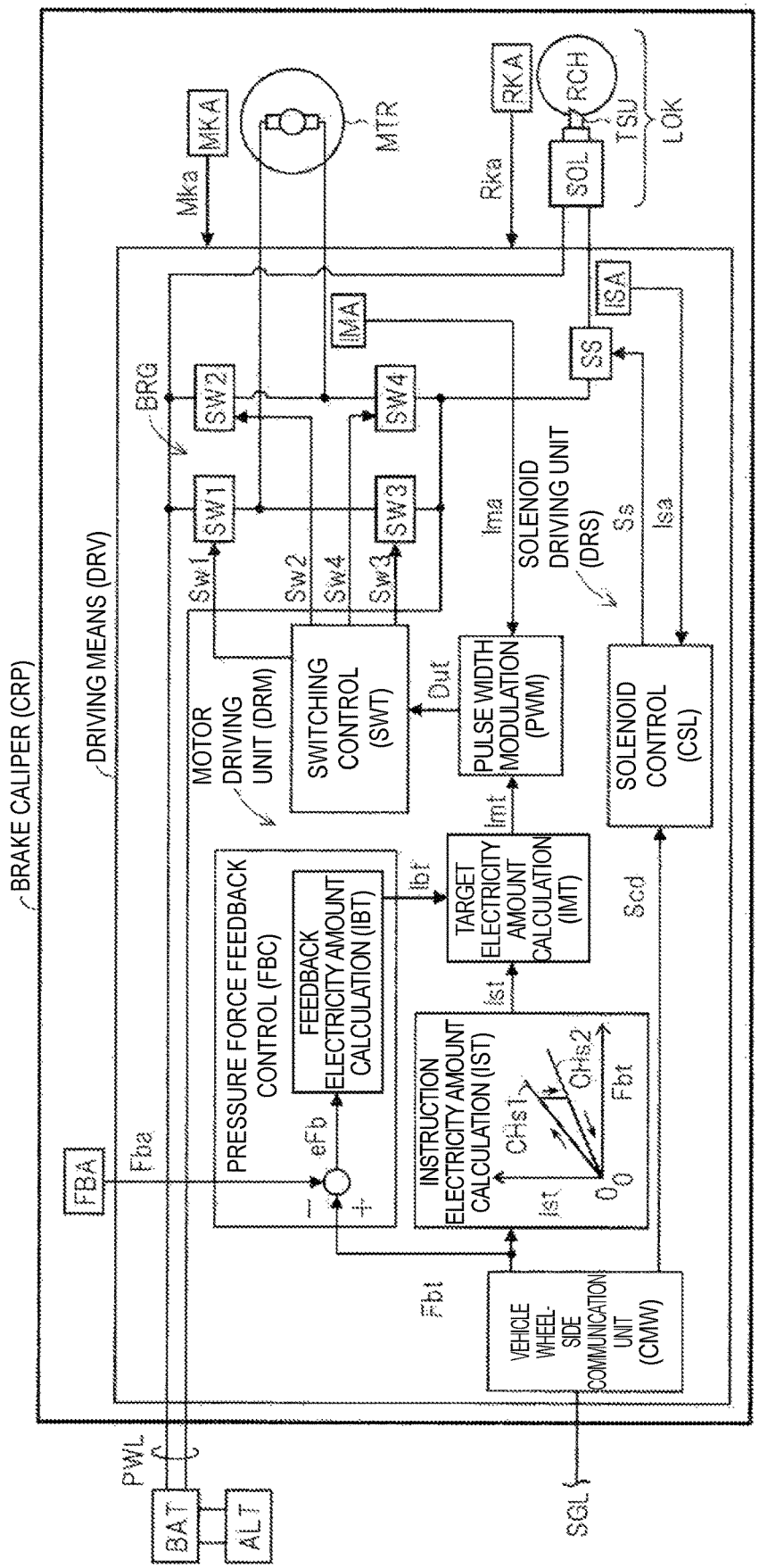
FIG. 2 is a schematic diagram for explaining a driving means.

The driving means DRV will be described with reference to a schematic diagram of FIG. 2. This is an example of the case where a motor with brush (which may simply be termed a brush motor) is employed as the electric motor MTR. The electric motor MTR and the solenoid SOL are driven by the driving means DRV. The driving means DRV is configured of the vehicle wheel-side communication unit CMW, a motor driving unit DRM, and a solenoid driving unit DRS. The driving means (driving circuit) DRV corresponds to a part of the control means (controller) CTL.

Power is supplied to the driving means (driving circuit) DRV from a rechargeable battery BAT and a dynamo ALT fixed to the vehicle side through power lines PWL. The acquired result (actual pressing force) Fba from the pressing force acquiring means FBA, the acquired result (motor rotation angle) Mka from the position acquiring means MKA, and the acquired result (gear rotation angle) Rka of the ratchet wheel from the rotation angle acquiring means RKA are input to the driving means DRV.

Moreover, the signals Fbt, Scd for controlling the electric motor MTR and the solenoid SOL are input to the driving means DRV (especially, the vehicle wheel-side communication unit CMW) from the electronic control unit ECU (especially, the vehicle body-side communication unit CMB) through a signal line SGL. On the other hand, the actual pressing force Fba, the gear rotation angle Rka, and the motor rotation angle Mka are output from the driving means DRV to the electronic control unit ECU through the signal line SGL.

<<Motor Driving Unit DRM>>

In the motor driving unit DRM, the amount of electricity of the electric motor MTR (that is, the output torque of the electric motor MTR) and an electricity application direction (that is, the rotation direction of the electric motor MTR) are controlled to drive the electric motor MTR. The motor driving unit DRM is configured of an instruction electricity amount calculation block IST, a pressing force feedback control block FBC, a target electricity amount calculation block IMT, a pulse width modulation block PWM, a switching control block SWT, and the bridge circuit BRG.

The instruction electricity amount calculation block IST calculates an instruction electricity amount Ist based on the target pressing force Fbt and preset calculation characteristics (calculation map) CHs1, CHs2. The instruction electricity amount Ist is a target value of the amount of electricity supplied to the electric motor MTR to achieve the target pressing force Fbt. Specifically, the instruction electricity amount Ist is calculated such that it increases monotonically as the target pressing force Fbt increases. Here, the calculation map of the instruction electricity amount Ist is configured of two characteristics CHs1, CHs2 by considering hysteresis of the braking means BRK.

Here, the "amount of electricity" is a state quantity (variable) for controlling the output torque of the electric motor MTR. Since the electric motor MTR outputs the torque that is substantially proportional to a current, a current target value of the electric motor MTR may be used as the target value of the amount of electricity. Further, since the current increases as a result of increasing a supplied voltage to the electric motor MTR, a supplied voltage value may be used as the target electricity amount. Moreover, since the supplied voltage value may be modulated by a duty ratio in pulse width modulation, this duty ratio may be used as the amount of electricity.

The pressing force feedback control block FBC calculates a pressing force feedback electricity amount Ibt based on the target pressing force (target value) Fbt and the actual pressing force (actual value) Fba. Firstly, in the pressing force feedback control block FBC, a deviation (pressing force deviation) eFb (=Fbt-Fba) between the target pressing force Fbt and the actual pressing force Fba is calculated. The pressing force feedback electricity amount Ibt is calculated in the feedback electricity amount calculation block MT within the pressing force feedback control block FBC based on the pressing force deviation eFb. Specifically, a proportional gain (predetermined value) Kp is multiplied to the pressing force deviation eFb to determine a proportional term of the feedback electricity amount Ibt. Further, a derivative value and an integrated value of the pressing force deviation eFb are calculated, to which a derivative gain (predetermined value) Kd and an integration gain (predetermined value) Ki are multiplied, and a derivative term and an integration term of the feedback electricity amount Ibt are thereby calculated. Then, the proportional term, the derivative term, and the integration term are added to determine a finalized feedback electricity amount Ibt. That is, in the pressing force feedback control block FBC, a so-called PID control based on the pressing force is executed and the feedback electricity amount Ibt is determined thereby.

In the target electricity amount calculation block IMT, a target electricity amount Imt, which is a finalized target value for the electric motor MTR, is calculated. The instruction electricity amount Ist is calculated as a value corresponding to the target pressing force Fbt; however, a difference may be generated between the target pressing force Fbt and the actual pressing force Fba due to changes in efficiency of a power transmission member of the braking means BRK. Therefore, the target electricity amount Imt is determined such that the instruction electricity amount Ist is adjusted by the feedback electricity amount Ibt to decrease the aforementioned difference. Specifically, the target electricity amount Imt is calculated by adding the feedback electricity amount Ibt to the instruction electricity amount Ist.

In the parking instruction calculation block PKS (especially, the engagement operation block CHP and the release operation block CHQ), the parking pressing force Fbp is calculated based on preset time-series patterns CHp, CHq. In a case where the feedback electricity amount Ibt is not employed in the calculation of the target electricity amount Imt, parking brake control operations (the engagement operation and the release operation) are sped up if the transmission efficiency of the braking means BRK is high. However, as the transmission efficiency of the braking means BRK decreases, delays occur in the operations of the parking brake. That is, stable execution of the parking brake control becomes difficult. The pressing force feedback control allows the target electricity amount Imt to be adjusted by the feedback electricity amount Ibt and calculated such that the target value Fbt and the actual value Fba of the pressing force match. Due to this, the stable (always constant in time response) execution of the parking brake control (the engagement operation and the release operation) can be performed at all times regardless of the changes in the efficiency of the braking means BRK.

The rotation direction of the electric motor MTR is determined according to a sign of the target electricity amount Imt (the value thereof being positive or negative), and the output (rotational force) of the electric motor MTR is controlled based on a magnitude of the target electricity amount Imt. For example, in a case where the sign of the target electricity amount Imt is a positive sign (Imt>0), the electric motor MTR is driven in the forward direction (pressing force increasing direction), and in a case where the sign of the target electricity amount Imt is a negative sign (Imt<0), the electric motor MTR is driven in the reverse direction (pressing force decreasing direction). Further, the output torque of the electric motor MTR is controlled to be larger when an absolute value of the target electricity amount Imt is larger, and the output torque is controlled to be smaller when the absolute value of the target electricity amount Imt is smaller.

In the pulse width modulation block PWM, an instruction value (target value) Dut for performing the pulse width modulation is calculated based on the target electricity amount Imt. Specifically, in the pulse width modulation block PWM, a pulse width duty ratio Dut (rate of the on-state within a cycle in periodic pulse waves) is determined based on the target electricity amount Imt and a preset characteristic (calculation map). Together with the above, in the pulse width modulation block PWM, the rotation direction of the electric motor MTR is determined based on the sign of the target electricity amount Imt (the positive sign or the negative sign). For example, the rotation direction of the electric motor MTR is set such that the forward direction is a positive (plus) value and the reverse direction is a negative (minus) value. Since a finalized output voltage is determined according to an input voltage (power source voltage) and the duty ratio Dut, the rotation direction of the electric motor MTR and the amount of electricity supplied to the electric motor MTR (that is, the output of the electric motor MTR) are determined in the pulse width modulation block PWM.

Moreover, in the pulse width modulation block PWM, a so-called current feedback control is executed. The detected value (for example, the actual current value) Ima of the electricity amount acquiring means IMA is input to the pulse width modulation block PWM, and the duty ratio Dut is corrected (slightly adjusted) based on a deviation (electricity amount deviation) eIm between the target electricity amount Imt and the actual electricity amount Ima. The target value Imt and the actual value Ima are controlled to match each other in this current feedback control, by which a highly accurate motor control can be achieved.

In the switching control block SWT, signals (driving signals) Sw1 to Sw4 for driving switching elements SW1 to SW4 configuring the bridge circuit BRG are determined based on the duty ratio (target value) Dut. The driving signals Sw1 to Sw4 are determined such that an electricity application time per unit time becomes longer for larger duty ratios Dut, and larger current is thereby flown in the electric motor MTR. By these driving signals Sw1 to Sw4, electricity application/nonapplication and the electricity application time per unit time in each of the switching elements SW1 to SW4 are controlled. That is, the rotation direction and the output torque of the electric motor MTR are controlled by the driving signals Sw1 to Sw4.

The bridge circuit BRG is a circuit that does not require bidirectional power sources, and by which the electricity application direction to the electric motor is changed by a single power source, and the rotation direction (the forward direction or the reverse direction) of the electric motor can thereby be controlled. The bridge circuit BRG is configured of the switching elements SW1 to SW4. The switching elements SW1 to SW4 are elements that can turn on (apply electricity to)/off (not apply electricity to) a part of an electric circuit. The switching elements SW1 to SW4 are driven by the signals Sw1 to Sw4 from the switching control block SWT. The rotation direction and the output torque of the electric motor MTR are adjusted by electricity-applied/nonapplied states of the respective switching elements being switched. For example, MOS-FETs and IGBTs may be used as the switching elements.

In the case where the electric motor MTR is driven in the forward direction, the switching elements SW1, SW4 are brought to the electricity applied state (on-state) and the switching elements SW2, SW3 are brought to the electricity nonapplied state (off-state). To the contrary, in the case where the electric motor MTR is driven in the reverse direction, the switching elements SW1, SW4 are brought to the electricity nonapplied state (off-state) and the switching elements SW2, SW3 are brought to the electricity applied state (on-state). That is, in a reverse drive of the electric motor MTR, the current is flown in a direction opposite to that for a forward drive.

A brushless motor may be employed instead of the motor with brush. In this case, the bridge circuit BRG is configured of six switching elements. Similarly to the case with the motor with brush, the electricity applied state/electricity nonapplied state of the switching elements are controlled based on the duty ratio Dut. In the brushless motor, a rotor position (rotation angle) Mka of the electric motor MTR is acquired by the position acquiring means MKA. Then, the six switching elements configuring the three-phase bridge circuit are controlled based on this actual position Mka. The switching elements sequentially switch directions of U-phase, V-phase, and W-phase coil electricity amounts (that is, a magnetizing direction) of the bridge circuit BRG, and the electric motor MTR is thereby driven. A rotation direction (forward or reverse direction) of the brushless motor is determined by the relation between a position where magnetic excitation is caused and the rotor.

The electricity amount acquiring means (for example, a current sensor) IMA for the electric motor is provided in the bridge circuit BRG. The electricity amount acquiring means IMA acquires the amount of electricity (actual value) Ima of the electric motor MTR. For example, a value of the current actually flowing in the electric motor MTR may be detected as the actual electricity amount Ima by the motor current sensor IMA.

<<Solenoid Driving Unit DRS>>

In the solenoid driving unit DRS, an electricity applied state or an electricity nonapplied state of the solenoid actuator (which may simply be termed a solenoid) SOL is controlled. The solenoid SOL generates an attracting force while the electricity is applied, and does not generate the attracting force while the electricity is not applied. The solenoid driving unit DRS is configured of a solenoid control block CSL and a switching element SS.

In the solenoid control block CSL, the instruction signal Scd is converted to a solenoid driving signal Ss and is output to the switching element SS. The switching element SS controls the electricity applied state of the solenoid SOL. Specifically, the switching element SS is an element that can turn on (apply electricity to)/off (not apply electricity to) a part of an electric circuit, and electricity applied/nonapplied states of the switching element SS are switched based on the driving signal Ss. Due to this, generation/release of the attracting force of the solenoid SOL are switched (that is, the solenoid SOL is driven). For example, an MOS-FET, an IGBT, or a relay may be used as the switching element SS.

The solenoid driving unit DRS is provided with an electricity amount acquiring means (for example, a current sensor) ISA for the solenoid. The electricity amount acquiring means ISA acquires an electricity amount (actual value) Isa of the solenoid SOL. For example, a value of the current actually flowing in the solenoid SOL is detected as the actual electricity amount Isa by the solenoid current sensor ISA.

<Parking Brake Lock Mechanism LOK>

Figure 3:
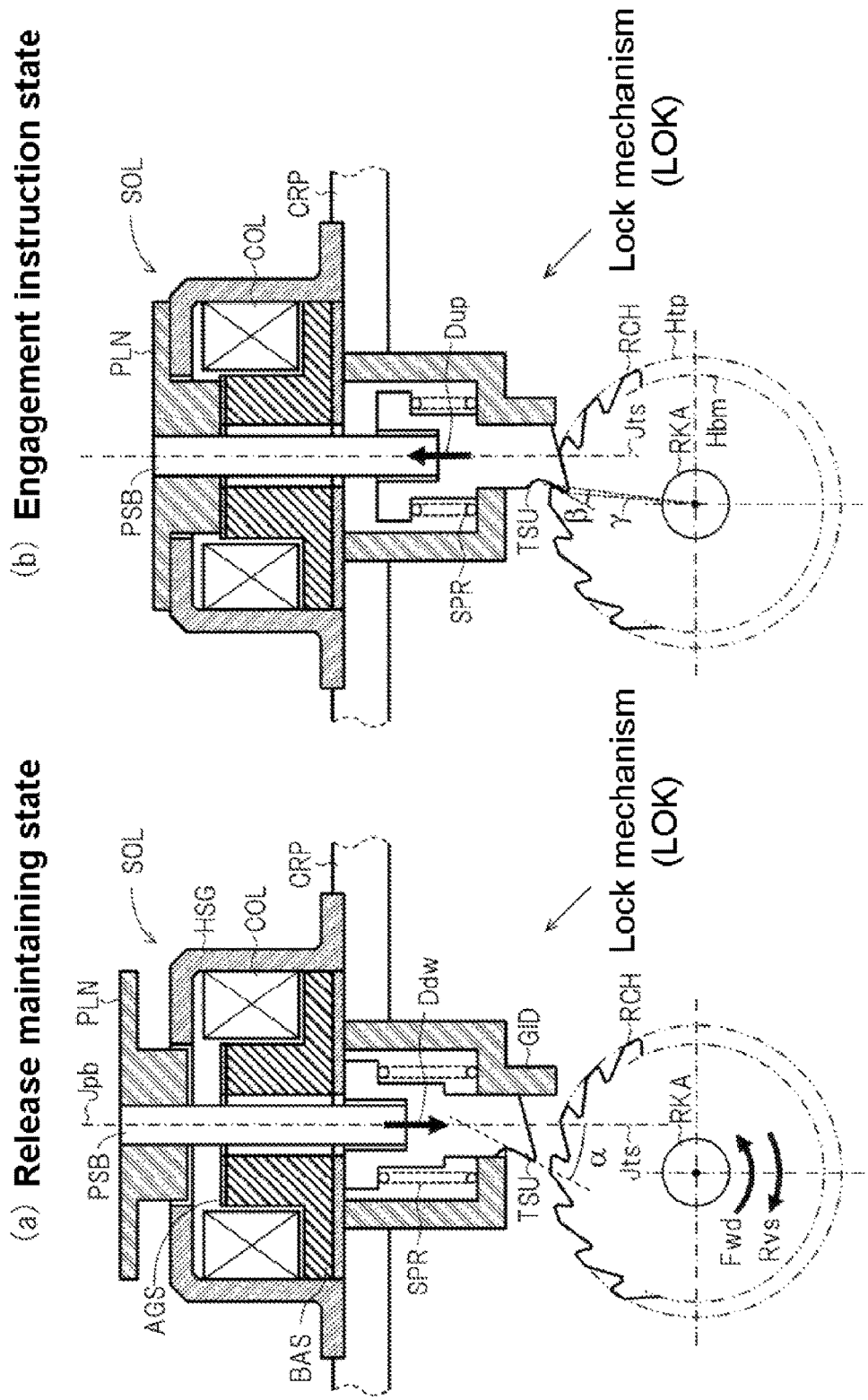
FIGS. 3A and 3B are schematic diagrams for explaining a lock mechanism for a parking brake.

The parking brake lock mechanism (which will simply be termed a lock mechanism) LOK will be described with reference to schematic diagrams of FIGS. 3A, 3B. The lock mechanism LOK exhibits a function of the parking brake by the hook member TSU interlocking with the ratchet wheel RCH. Here, a case where the hook member TSU and the ratchet wheel RCH are interlocked (a case where the lock mechanism LOK is operating) is a state in which the parking brake is in effect, and a case where they are not interlocked (a case where the lock mechanism LOK is not operating) is a state in which the parking brake is not in effect.

Firstly, a structure of the lock mechanism LOK will be described. The lock mechanism LOK is configured as a ratchet mechanism (pawl brake). The ratchet mechanism restricts a rotating operation in one direction. Thus, in a state where the ratchet mechanism is interlocking, the lock mechanism LOK allows rotation in one direction (direction shown by an arrow Fwd) but restrains rotation in the other direction (direction shown by an arrow Rvs) (restricts movement therealong). FIG. 3A shows a parking brake release maintaining state (state in which the hook member TSU is at a release position) and FIG. 3B shows a parking brake engagement maintaining state (state in which the hook member TSU is at an interlocking position).

The lock mechanism LOK is configured of the solenoid actuator SOL, the hook member TSU, a guide member GID, the ratchet wheel RCH, and an elastic member SPR.

The solenoid actuator (which may simply be termed a solenoid) SOL is fixed to the caliper CRP. In a case where the lock mechanism LOK transitions from a released state to an engaged state, the hook member TSU is pressed toward the ratchet wheel RCH by a push bar PSB which is a part of the solenoid SOL by electric application to the solenoid SOL. Specifically, the hook member TSU receives a force from the solenoid SOL in a direction (interlocking direction) Ddw approaching a rotation axis of the ratchet wheel RCH. The hook member TSU is positioned by the guide member GID fixed to the caliper CRP, and it is allowed to move only in the interlocking direction Ddw and an opposite direction (releasing direction) Dup. The parking brake function is exhibited by the hook member TSU interlocking with the ratchet wheel RCH.

The solenoid SOL is configured of a coil COL, a stationary iron core (which is also called a base) BAS, a movable iron core (which is also called a plunger) PLN, the push bar PSB, and a housing HSG. The coil COL and the base BAS are accommodated in the housing HSG, and the housing HSG is fixed to the caliper CRP. That is, the solenoid SOL is fixed to the caliper CRP.

The coil COL generates a magnetic field by a current being flown in a conduction line. When the magnetic field is generated in the coil COL by the electricity application, magnetic flux penetrates through the stationary iron core (base) BAS, and the BAS attracts the movable iron core (plunger) PLN. Further, the plunger PLN is attracted toward the base BAS at all times during the electricity application; however, when the electricity application is interrupted, this attracting force disappears. The push bar PSB is fixed to the plunger PLN, and the hook member TSU is pressed by the push bar PSB according to an attracting operation of the plunger PLN.

The hook member TSU is provided with a protrusion (pawl) at its one end. This protrusion portion interlocks with the ratchet wheel RCH. The other end of the hook member TSU abuts the push bar PSB. When the electricity application to the solenoid SOL is performed, the hook member TSU is pressed by the push bar PSB and is moved to the direction (interlocking direction) Ddw toward the ratchet wheel RCH.

A rake angle $\alpha$ is provided in a protruding shape (pawl shape) of the hook member TSU. Here, the rake angle $\alpha$ is an angle formed by a contact portion between the pawl of the hook member TSU and the ratchet wheel RCH, and the interlocking direction Ddw. In the state where the hook member TSU and the ratchet wheel RCH are interlocked, the hook member TSU receives a force from the ratchet wheel RCH at the contact portion with the ratchet wheel RCH. Since a component force of this force is applied in the interlocking direction Ddw by the rake angle $\alpha$, the state in which the hook member TSU and the ratchet wheel RCH are interlocked is maintained even after the electricity application to the solenoid SOL has been terminated.

The ratchet wheel RCH is fixed to the input member SFI, and rotates integrally with the electric motor MTR. Unlike a general gear, the ratchet wheel RCH is formed with teeth having directionality (saw teeth-like teeth). Directionality regarding the motion of the ratchet wheel RCH about its rotation axis is generated by this "saw teeth-like" shape. Specifically, its rotary motion Fwd corresponding to the forward direction of the electric motor MTR (motion in the direction along which PSN approaches KTB, the actual pressing force Fba increases, and the braking torque increases) is permitted, but its motion Rvs corresponding to the reverse direction of the electric motor MTR (motion in the direction along which PSN separates away from KTB, the actual pressing force Fba decreases, and the braking torque decreases) is restrained (locked). When the ratchet wheel RCH and the hook member TSU are interlocked, the rotation (reverse direction Rvs) of the electric motor MTR corresponding to the direction along which the pressing member PSN (that is, the friction member MSB) separates away from the rotary member KTB is restricted.

An elastic member (for example, a return spring) SPR is provided between the guide member GID (that is, the caliper CRP) and the hook member TSU in a compressed state. Accordingly, the elastic member SPR presses the hook member TSU against the guide member GID (caliper CRP) at all times in the opposite direction (releasing direction) Dup from the interlocking direction Ddw. The plunger PLN is pulled into the solenoid SOL by the solenoid SOL being applied with electricity, and the push bar PSB presses the hook member TSU in the interlocking direction Ddw. That is, a force in the interlocking direction Ddw (interlocking force) that a movable member PSB of the solenoid SOL exerts on the hook member TSU is generated. When the attracting force (interlocking force) of the solenoid SOL becomes larger than a pressing force by the elastic member SPR (being a spring force, which is a releasing force that presses TSU in the releasing direction Dup), the hook member TSU is moved to an interlocking position and the hook member TSU and the ratchet wheel RCH interlock with each other (see FIG. 3B). However, when the electricity application to the solenoid SOL stops, the attracting force of the solenoid SOL is lost, and the hook member TSU and the push bar PSB (plunger PLN) are returned to the release position by the elastic member SPR (see FIG. 3A).

The gear rotation angle acquiring means RKA that acquires (detects) the rotation angle (gear rotation angle) Rka of the ratchet wheel RCH is provided coaxially with the ratchet wheel RCH. That is, the gear rotation angle acquiring means RKA is fixed to the input member (input shaft) SFI from the electric motor MTR to the reduction gear GSK. The acquisition result (motor rotation angle) Mka of the motor rotation angle acquiring means (position acquiring means) MKA may be employed as the gear rotation angle Rka. Further, since a gear ratio of the reduction gear GSK is known, the gear rotation angle acquiring means RKA may be provided on the output member (output shaft) SFO of the reduction gear GSK. (For the above, see FIG. 1.)

<<State Transition in Interlocking Hook Member TSU and Ratchet Wheel RCH>>

A case where the hook member TSU and the ratchet wheel RCH transition from a state of not being interlocked to a state of being interlocked will be described. FIG. 3A shows the state in which the electricity application to the solenoid SOL is not performed and the hook member TSU and the ratchet wheel RCH are not interlocked (release maintaining state). Here, the hook member TSU is pressed against the solenoid SOL (or the caliper CRP) by the elastic force of the elastic member SPR. The position of the hook member TSU in this state (the position where TSU is separated utmost from RCH) is termed the "release position".

The electricity application to the electric motor MTR is performed and the electric motor MTR is driven in the forward direction Fwd, as a result of which the pressing force Fba is increased. Then, the electricity application to the solenoid SOL (that is, the coil COL) is started after the pressing force Fba has reached a predetermined value. The plunger PLN is attracted to the base BAS by this electricity application, and the plunger PLN is pulled in the interlocking direction Ddw. The push bar PSB fixed to the plunger PLN moves the hook member TSU in the interlocking direction Ddw by the attracting force of the solenoid SOL (that is, the interlocking force being the force by which PSB pushes TSU) becoming larger than the elastic force of the elastic member SPR (that is, the releasing force being the force that releases the interlocking of TSU and RCH). At this occasion, the movement of the hook member TSU is guided by the guide member GID.

The electric motor MTR is driven in the reverse direction Rvs in the state where the hook member TSU is in contact with the ratchet wheel RCH. As a result, the hook member TSU is surely interlocked with the ratchet wheel RCH. After this interlocked state has been confirmed, the electricity application to the solenoid SOL is stopped and the electricity application to the electric motor MTR is also stopped (the engagement maintaining state of FIG. 3B).

The hook member TSU is provided with the rake angle $\alpha$ (the angle formed by a center axis Jts of TSU and the contact portion between TSU and RCH), and the ratchet wheel RCH is provided with an inclination angle $\beta$ (an angle formed by a line connecting a tooth tip of RCH and a rotation axis of RCH and the contact portion between TSU and RCH). A force from the ratchet wheel RCH (tangential force) acts on the hook member TSU (especially at the contact portion with the ratchet wheel RCH) by rigidity of the caliper CRP, the friction members MSB, and the like. Since a component force of a tangential force by the rake angle $\alpha$ acts in the interlocking direction Ddw, the interlocked state after termination of the electricity application can surely be maintained.

Next, a case where the hook member TSU and the ratchet wheel RCH transition from the state of being interlocked to the state of not being interlocked will be described. As shown in FIG. 3B, the state in which the hook member TSU and the ratchet wheel RCH are interlocked is maintained even in the state where the electricity application to the electric motor MTR and the solenoid SOL is not performed. This interlocked state is released when the electricity application to the electric motor MTR is performed. At this occasion, the electricity application to the solenoid SOL remains in a stopped state.

When the electric motor MTR is driven and rotated in the forward direction Fwd, the hook member TSU rides over a tooth of the ratchet wheel RCH with which it has been interlocked. At this occasion, the hook member TSU is moved to the release position by the elastic force (spring force) of the elastic member (compression spring) SPR in the direction (releasing direction) Dup separating away from the ratchet wheel RCH. Specifically, in the state where the ratchet wheel RCH and the hook member TSU are interlocked, when the ratchet wheel RCH rotates at a larger degree than an angle $\gamma$ (which will be termed an "interlocking angle") formed by a line connecting the tooth tip of the ratchet wheel RCH and a rotation center of the ratchet wheel RCH and a line connecting a pawl tip of the hook member TSU and the rotation center of the ratchet wheel RCH, the interlocked state of the ratchet wheel RCH and the hook member TSU is released. As a result, the hook member TSU is pressed by the elastic member SPR and returns to the state shown in FIG. 3A. The interlocking angle $\gamma$ is a value that is preset according to the angles $\alpha$, $\beta$ and a geometric relationship between the hook member TSU and the ratchet wheel RCH (a distance between the center axis Jts of the hook member TSU and a rotation axis Jrc of the ratchet wheel RCH).

<Control State of Parking Brake>

Figure 4:
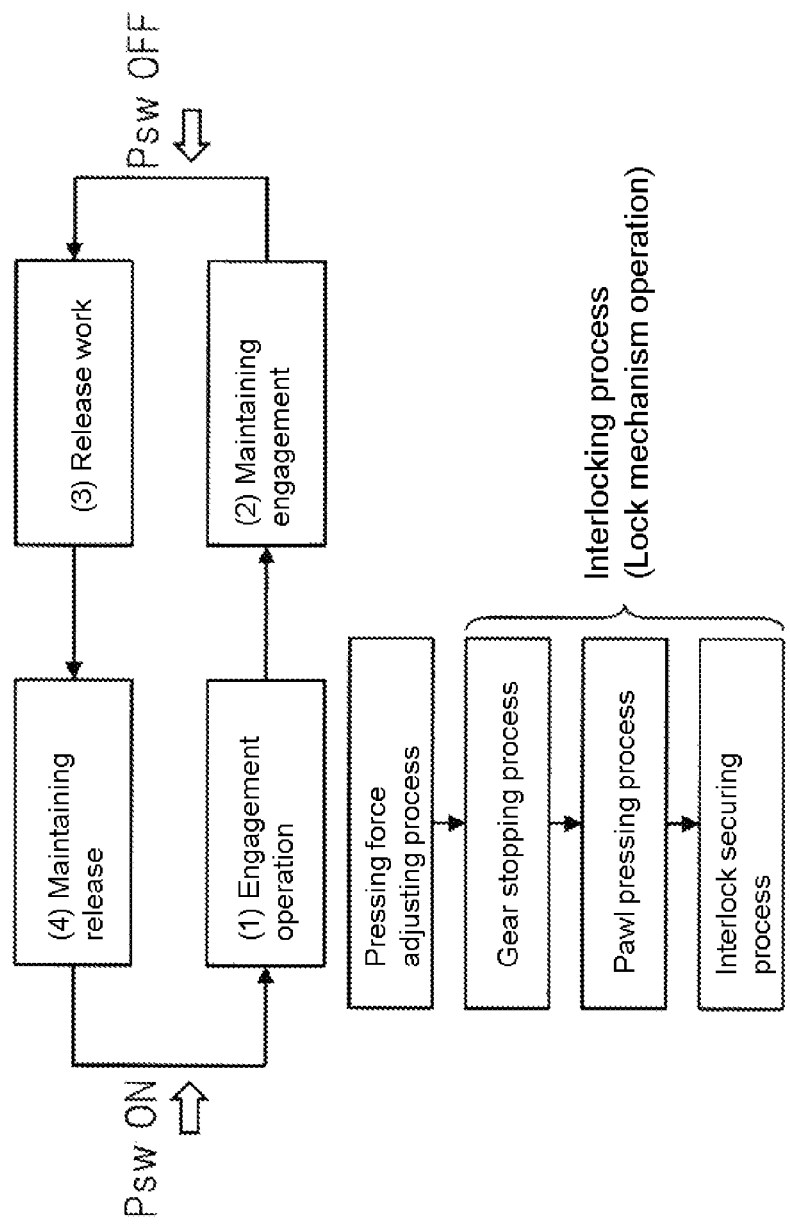
FIG. 4 is a state transition diagram for explaining a control state of the parking brake.

With reference to a state transition diagram of FIG. 4, a control state in the parking brake control will be described. There are four states as the control state Sgj of the parking brake, namely "engagement operation", "maintaining engagement", "release operation", and "maintaining release".

The "maintaining engagement" is a case where the "state in which the hook member TSU and the ratchet wheel RCH are interlocked" is maintained. That is, in the engagement maintaining state, the parking brake lock mechanism LOK is actuated and the parking brake function is thereby exhibited. The "maintaining release" is a case where the "state in which the hook member TSU and the ratchet wheel RCH are not interlocked" is maintained. That is, in the release maintaining state, the parking brake lock mechanism LOK is not actuated and the parking brake function is not exhibited.

The "engagement operation" is an operation for making transition from the "state in which the hook member TSU and the ratchet wheel RCH are not interlocked" to the "state in which the hook member TSU and the ratchet wheel RCH are interlocked". To the contrary, the "release operation" is an operation for making transition from the "state in which the hook member TSU and the ratchet wheel RCH are interlocked" to the "state in which the hook member TSU and the ratchet wheel RCH are not interlocked".

In the release maintaining state, when the driver switches the parking switch PSW from the off-state to the on-state, the parking signal Psw also changes from the off-state to the on-state. The execution of the engagement operation is initiated based on this change. In the engagement operation, firstly an adjusting process for the pressing force of the friction members MSB on the rotary member KTB (pressing force adjusting process) is performed. Then, a stopping process for the ratchet wheel RCH (gear stopping process), a pressing process for the hook member TSU (pawl pressing process), and an interlock securing process for the hook member TSU and the ratchet wheel RCH are executed. The gear stopping process, the pawl pressing process, and the interlock securing process are collectively termed an "interlocking process", and this corresponds to the "operation of the lock mechanism".

As the interlocking process, specifically, in a state in which the electricity application state to the electric motor MTR is made constant and the rotary motion of the ratchet wheel RCH is stopped, after applying electricity to the solenoid SOL and pressing the hook member TSU against the ratchet wheel RCH, the parking brake control means PKC adjusts the electricity application state so that the electric motor MTR rotates in the direction by which the pressing force Fba is reduced.

When the execution of the engagement operation (that is, the interlocking process) is completed, the parking brake comes to be in the engagement maintaining state. In this state, the electricity application to the electric motor MTR and the solenoid SOL is not necessary.

In the engagement maintaining state, when the driver switches the parking switch PSW from the on-state to the off-state, the parking signal Psw also changes from the on-state to the off-state. The execution of the release operation is initiated based on this change. Then, when the release operation is completed, the parking brake release-maintaining state takes place.

<Parking Brake Control>

Figure 5:
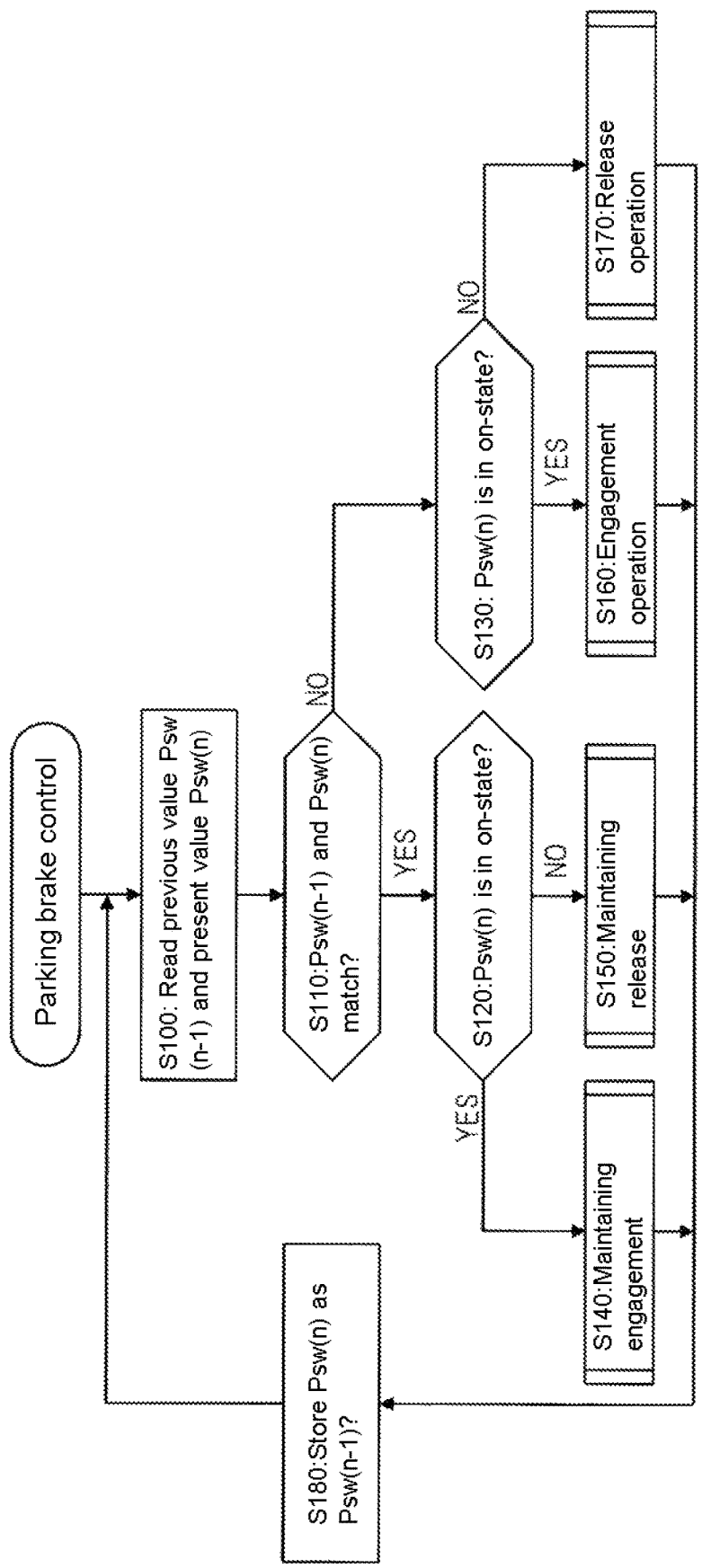
FIG. 5 is a flow diagram for explaining an overview of a parking brake control.

An overview of the parking brake control will be described with reference to a flowchart of FIG. 5. In the parking brake control, one of the aforementioned four control states Sgj (the engagement operation state, the engagement maintaining state, the release operation state, and the release maintaining state) is selected based on the parking signal Psw. This selecting process corresponds to the calculation in the control state calculation block SGJ. The control state Sgj is output from the control state calculation block SGJ of the parking instruction calculation block PKS to the target pressing force calculation block FBT.

In step S100, a previous value Psw(n−1) of the parking signal Psw obtained in a previously-performed calculation cycle and a present value Psw(n) thereof obtained in a presently-performed calculation cycle are read. Then, the process proceeds to step S110. In step S110, the previous value Psw(n−1) and the present value Psw(n) are compared. In a case where the previous value Psw(n−1) and the present value Psw(n) match (case of "YES"), the process proceeds to step S120. On the other hand, in a case where the previous value Psw(n−1) and the present value Psw(n) do not match (case of "NO"), the process proceeds to step S130.

In step S120, a determination is made on whether or not the parking signal Psw(n) is in the on-state in the present calculation cycle. In a case where the parking signal Psw(n) is in the on-state (case of "YES"), the process proceeds to step S140. On the other hand, in a case where the parking signal Psw(n) is in the off-state (case of "NO"), the process proceeds to step S150. In step S130, similarly to step S120, the determination is made on whether or not the present value Psw(n) is in the on-state. In the case where the parking signal Psw(n) is in the on-state (case of "YES"), the process proceeds to step S160. On the other hand, in the case where the parking signal Psw(n) is in the off-state (case of "NO"), the process proceeds to step S170.

In step S140, the engaged state is maintained, and the control state Sgj of the parking brake is determined to be in the engagement maintaining state. In step S150, the released state is maintained, and the control state Sgj is determined to be in the release maintaining state. In step S160, the engagement operation is performed, and the control state Sgj is determined to be in the engagement operation state. In step S170, the release operation is performed, and the control state Sgj is determined to be in the release operation state. The process proceeds to step S180 after the processes of steps S140 to S170, and the present value Psw(n) is stored as the previous value Psw(n−1). Then, the process is returned to step S100.

<Pressing Force Adjusting Process in Engagement Operation>

Figure 6:
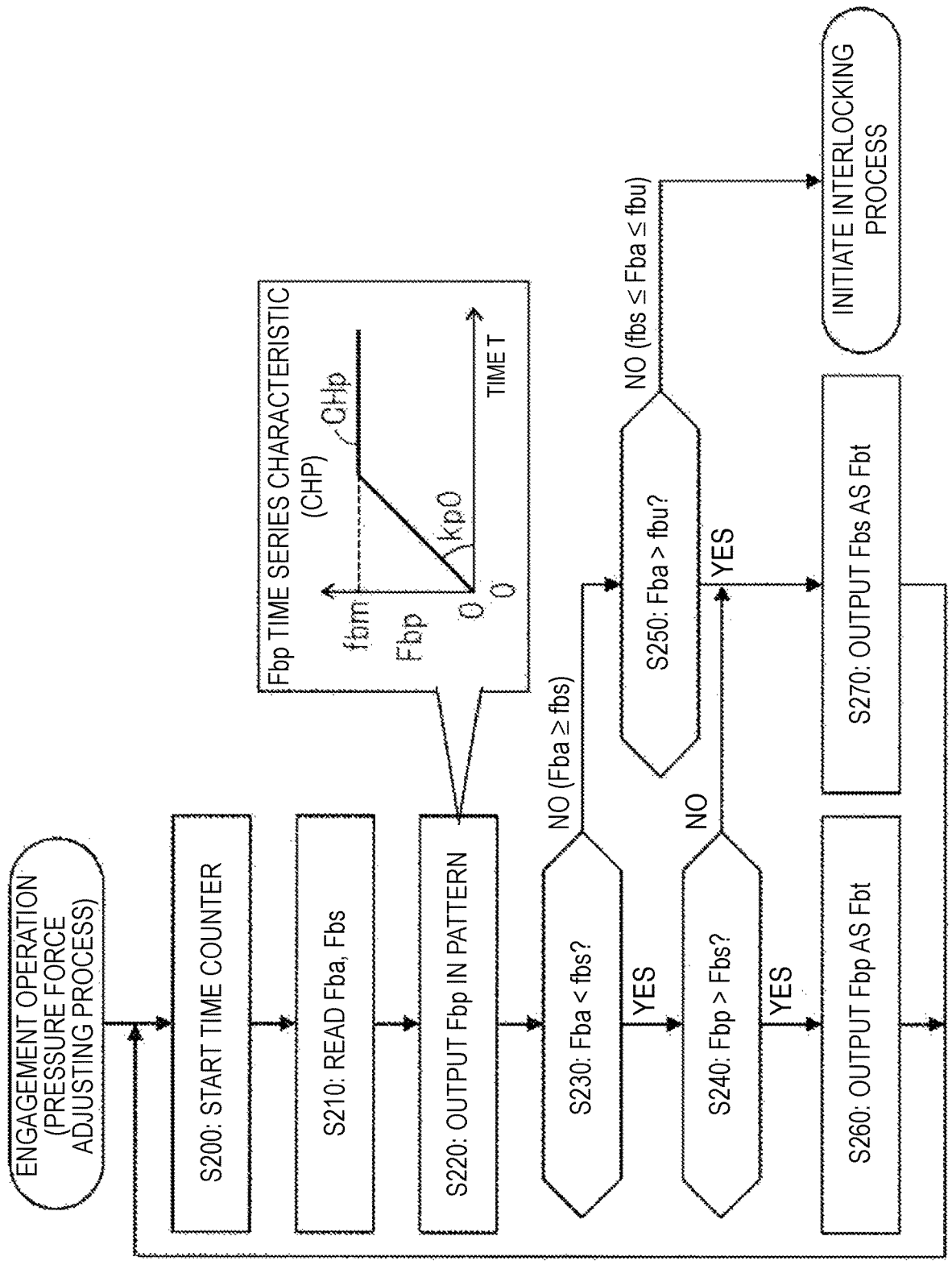
FIG. 6 is a flow diagram for explaining a pressing force adjusting process in an engagement operation in the parking brake control.

The pressing force adjusting process in the engagement operation of the parking brake control will be described with reference to a flowchart of FIG. 6. When the previous value Psw(n−1) is in the off-state and the present value Psw(n) is in the on-state in the parking signal (that is, in a calculation cycle transitioning from off to on), the process proceeds to step S160 and the engagement operation is initiated (see FIG. 5). The pressing force adjusting process corresponds to the engagement operation block CHP of the parking instruction calculation block PKS and a part of the target pressing force calculation block FBT (see FIG. 1).

Firstly in step S200, a time counter (timer) is started. Then, proceeding to step S210, the actual pressing force Fba and the instruction pressing force Fbs are read. Then, proceeding to step S220, the parking pressing force Fbp is output in pattern. The parking pressing force Fbp is the target value of the pressing force during the parking brake control (especially during the engagement operation). Specifically, as shown by the time-series characteristic CHp of the engagement operation block CHP, the parking pressing force Fbp is output such that it increases monotonically at the time gradient kp0 as the time elapses with the time point when the time counter is started as zero (starting point), and reaches the upper limit value fbm. Here, the upper limit value fbm is set with consideration to the power transmission efficiency in the braking means BRK to ensure that the actual pressing force Fba becomes larger than the upper value fbu.

In step S230, a determination is made on whether or not the actual pressing force Fba is smaller than a lower value (predetermined threshold) fbs. In a case where the actual pressing force Fba is smaller than the value fbs (case of "YES"), the process proceeds to step S240. Here, the lower value fbs is a preset predetermined value necessary to maintain a halted state of the vehicle. On the other hand, in a case where the actual pressing force Fba is equal to or larger than the value fbs (case of "NO"), the process proceeds to step S250.

In step S240, a determination is made on whether or not the parking pressing force Fbp is larger than the instruction pressing force Fbs. In a case where the parking pressing force Fbp is larger than the instruction pressing force Fbs (case of "YES"), the process proceeds to step S260. On the other hand, in a case where the parking pressing force Fbp is equal to or less than the instruction pressing force Fbs (case of "NO"), the process proceeds to step S270.

In step S250, a determination is made on whether or not the actual pressing force Fba is larger than the upper value fbu (predetermined threshold) fbu. Here, the upper value fbu is a preset predetermined value that is equal to or larger than the lower value fbs and is sufficient to maintain the halted state of the vehicle. In a case where the actual pressing force Fba is larger than the upper value fbu (case of "YES"), the process proceeds to step S270. In a case where the actual pressing force Fba is equal to or less than the upper value fbu (case of "NO"), the pressing force adjusting process of the engagement operation is completed, and the interlocking process of the engagement operation is initiated.

In step S260, the parking pressing force Fbp is output as the target pressing force Fbt. That is, in step S260, the target pressing force Fbt is determined by the parking brake control means PKC. After this, the process is returned to step S200. In step S270, the instruction pressing force Fbs is output as the target pressing force Fbt. That is, in step S270, the target pressing force Fbt is determined by the service brake control means SBC. After this, the process is returned to step S200.

As described with reference to the flowcharts as above, in the pressing force adjusting process of the engagement operation, larger one of the parking pressing force Fbp and the instruction pressing force Fbs is output as the target pressing force Fbt under a condition in which the actual pressing force Fba is smaller than the lower value fbs (≤fbu). Under a condition in which the actual pressing force Fba is larger than the upper value fbu (≥fbs), the instruction pressing force Fbs is output as the target pressing force Fbt. In other words, the driver's operation on the braking operation member BP (service brake operation) is prioritized over the parking brake in the case of Fba>fbu. The pressing force adjusting process is completed at a time point when a condition that the actual pressing force Fba is equal to or larger than the lower value fbs and equal to or less than the upper value fbu is met, and the interlocking process is initiated. That is, the interlocking process is initiated when the actual pressing force Fba enters a range between the value fbs and the value fbu (that is, at a time point when the actual pressing force Fba takes a value that is necessary and sufficient to maintain the halted state of the vehicle).

<Interlocking Process (Operation of Lock Mechanism LOK) in Engagement Operation>

The interlocking process in the engagement operation of the parking brake control will be described with reference to a flowchart of FIG. 7. When the pressing force adjusting process in the engagement operation is completed, the interlocking process in the engagement operation is initiated. The interlocking process in the engagement operation is executed by the parking brake control means PKC. Here, the interlocking process in the engagement operation corresponds to the "operation of the lock mechanism". Further, the interlocking process corresponds to the engagement operation block CHP and the solenoid instruction block SCD in the parking instruction calculation block PKS and a part of the target pressing force calculation block FBT (see FIG. 1).

Firstly, in step S300, the target pressing force Fbt is retained at a value at that time point (upon the completion of the pressing force adjusting process). Then, in step S310, the rotation angle (gear rotation angle) Rka of the ratchet wheel RCH is read. Next, in step S320, a determination is made on whether or not the gear rotation angle Rka is constant. That is, a determination is made on whether or not the ratchet wheel RCH is in a stationary state based on the gear rotation angle Rka. In a case where the gear rotation angle Rka is determined to be constant in step S320 (case of "YES"), the process proceeds to step S330. In a case where the gear rotation angle Rka is determined to be not constant in step S320 (the ratchet wheel RCH is still rotating) (case of "NO"), the process is returned to step S300.

In step S330, the gear rotation angle Rka at a time point when an affirmative determination is made in step S320 is set as a value rk1. Here, the value rk1 is termed a "retention value". Next, in step S340, the time counter (timer) is started. Then in step S350, a determination is made on whether or not a predetermined time tx1 has elapsed since the time counter started. In a case where the constant state of the gear rotation angle Rka (that is, the stationary state of RCH) has continued over the time tx1 (case of "YES"), the process proceeds to step S360. On the other hand, in a case where the constant state of the gear rotation angle Rka has not continued over the time tx1 (case of "NO"), the process is returned to step S300. The processes from step S300 to step S350 are for stopping the rotary motion of the ratchet wheel RCH and confirming its halted state, and thus they are called "gear stopping process".

The electricity application to the solenoid SOL is performed in step S360. In S370, similarly to the above, the time counter is started. In step S380, a determination is made on whether or not a predetermined time tx2 has elapsed since the time counter started. In a case where the electricity application time for the solenoid SOL has reached the time tx2 (case of "YES"), the process proceeds to step S390. On the other hand, in a case where the electricity application time for the solenoid SOL is less than the time tx2 (case of "NO"), the process returns to step S360. Processes from step S360 to step S380 are for surely pressing the hook member TSU against the ratchet wheel RCH by the solenoid SOL, and are called the "pawl pressing process".

In step S390, the electric motor MTR is driven in the reverse direction. That is, the target pressing force Fbt is reduced by a preset predetermined value (reduction value) fbg so that the electric motor MTR rotates in the direction of being reversed. The time counter is started in step S400 and the gear rotation angle Rka is read in step S410. In step S420, a determination is made on whether or not a deviation between the retention value rk1 set in step S330 and the gear rotation angle Rka is within a predetermined range. In a case where a difference between the retention value rk1 and the gear rotation angle Rka is equal to or less than a value hr1 and is within the predetermined range (case of "YES"), the process proceeds to step S430. On the other hand, in a case where the difference between the retention value rk1 and the gear rotation angle Rka is outside the predetermined range (case of "NO"), the process proceeds to step S480. Processes from step S390 to step S430 are for surely interlocking the hook member TSU and the ratchet wheel RCH and confirming a state thereof, and are called the "interlock securing process".

In step S430, a determination is made on whether or not a predetermined time tx3 has elapsed since the time counter started. In a case where the state in which the deviation between the retention value rk1 and the gear rotation angle Rka is within the predetermined range has continued over the time tx3 (case of "YES"), the process proceeds to step S450. On the other hand, in a case where the continuance of the aforementioned state is less than the time tx3 (case of "NO"), the process returns to step S390. When the condition of step S430 is met, the parking pressing force Fbp is brought to zero in step S450 (that is, Fbt=Fbs), and the electricity application to the solenoid SOL is terminated in step S460. Then, the gear rotation angle Rka at that time point is set as a value rk0 in step S470, and the interlocking process of the engagement operation is completed. Here, the value rk0 is called a "release value". The release value rk0 is employed in the release operation to be described later for a determination on whether or not the ratchet mechanism is interlocking. When the engagement operation process is completed, the control state Sgj is changed to the engagement maintaining state.

A case where the condition of step S420 is denied (case of "NO") is a case where the hook member TSU and the ratchet wheel RCH have not interlocked. Due to this, the actual pressing force Fba and the target pressing force Fbt are read in step S480, and the target pressing force Fbt is increased by a predetermined value fbx in step S490.

In step S500, a determination is made on whether or not the actual pressing force Fba is larger than the lower value fbs. In a case where the actual pressing force Fba is larger than the value fbs (case of "YES"), the process returns to step S300 and the interlocking process is restarted. On the other hand, in a case where the actual pressing force Fba is equal to or less than the value fbs in step S500 (case of "NO"), the process returns to step S480, where the predetermined value fbx is further added to the previous target pressing force Fbt so that the present target pressing force Fbt is increased and calculated. According to processes of steps S420, S480 to S500, the pressing force upon the parking braking within the predetermined range (fbs≤Fba≤fbu) can be ensured.

<Release Operation in Parking Brake Control>

Processes of the release operation in the parking brake control will be described with reference to a flowchart of FIG. 8. When the previous value Psw(n−1) is in the on-state and the present value Psw(n) is in the off-state in the parking signal (that is, in a calculation cycle transitioning from on to off), the process proceeds to step S170 and the release operation is initiated (see FIG. 5). The calculation process in the release operation corresponds to the release operation block CHQ of the parking instruction calculation block PKS and a part of the target pressing force calculation block FBT (see FIG. 1).

In step S800, the release value rk0 is read. Proceeding to step S810, the time counter (timer) is started. In step S820, the gear rotation angle Rka and the instruction pressing force Fbs are read. Then, proceeding to step S830, the parking pressing force Fbp is output in pattern. The parking pressing force Fbp is the target value of the pressing force during the parking brake control (especially during the release operation). Specifically, as shown by the time-series characteristic CHq of the release operation block CHQ, the parking pressing force Fbp is output such that it increases monotonically at the time gradient kq0 as the time elapses with the time point when the time counter is started (step S810) as zero (starting point).

In step S840, a determination is made on whether or not the parking pressing force Fbp is larger than the instruction pressing force Fbs. In a case where the parking pressing force Fbp is larger than the instruction pressing force Fbs (case of "YES"), the process proceeds to step S850. On the other hand, in a case where the parking pressing force Fbp is equal to or less than the instruction pressing force Fbs (case of "NO"), the process proceeds to step S860.

In step S850, the parking pressing force Fbp is output as the target pressing force Fbt. That is, in step S850, the target pressing force Fbt is determined by the parking brake control means PKC. After this, the process proceeds to step S870.

In step S860, the instruction pressing force Fbs is output as the target pressing force Fbt. That is, in step S860, the target pressing force Fbt is determined by the service brake control means SBC. After this, the process proceeds to step S870.

In step S870, a determination is made on whether or not a deviation between the release value rk0 read in step S800 and the gear rotation angle Rka is within a predetermined range. In a case where a difference between the release value rk0 and the gear rotation angle Rka is equal to or less than a value hr0 and is within the predetermined range (case of "YES"; case of "(Rka-rk0)≤hr0"), the process is returned to step S810. On the other hand, in a case where the difference between the release value rk0 and the gear rotation angle Rka is outside the predetermined range (case of "NO"; case of "(Rka-rk0)>hr0"), the process proceeds to step S880. In step S880, the parking pressing force Fbp is brought to zero. After this, the release operation is completed and the release maintaining state is initiated. The control state Sgj is changed from the release operation state to the release maintaining state. Here, the predetermined value hr0 is preset as a value that is larger than a value corresponding to the interlocking angle γ.

As described with reference to the flowchart above, in the release operation in the parking brake control, larger one of the parking pressing force Fbp and the instruction pressing force Fbs is output as the target pressing force Fbt. In other words, the driver's operation on the braking operation member BP (service brake operation) is prioritized over the parking brake, and control interference is prevented. Further, since the hook member TSU is ensured to be at the release position by being pressed by the elastic member SPR in the case where the gear rotation angle Rka became larger than the release value rk0 by the predetermined value hr0, the release operation is thereby completed and the control state Sgj is changed to the release maintaining state.

<Electricity Amount Limiting Process in Parking Brake Control>

The electricity amount limiting process in the parking brake control will be described with reference to a flowchart of FIG. 9. In the electricity amount limiting process, consumed power of the braking means BRK is reduced according to the control state Sgj. Specifically, in the case where the control state Sgj of the parking brake control is in the engagement maintaining state, the electricity application to the electric motor MTR caused by the braking operation amount Bpa by the driver is restricted. The electricity amount limiting process corresponds to a part of the target pressing force calculation block FBT (see FIG. 1).

In step S900, the control state Sgj and the target pressing force Fbt are read. In step S910, a determination is made regarding the control state Sgj of the parking brake control as to whether it is in the engagement maintaining state or not, according to the control state Sgj. In a case where the control state Sgj indicates the engagement maintaining state and the determination in step S910 is made affirmatively (case of "YES"), the process proceeds to step S920. On the other hand, in a case where the control state Sgj indicates a state other than the engagement maintaining state and the determination in step S910 is made negatively (case where it is not in the engagement maintaining state and "NO" is determined), the process proceeds to step S930.

In step S920, a determination is made on whether or not the target pressing force Fbt is smaller than a predetermined value fbk. In a case where the target pressing force Fbt is smaller than the value fbk and the determination in step S920 is made affirmatively (case of "YES"), the process proceeds to step S940. On the other hand, in a case where the target pressing force Fbt is equal to or larger than the predetermined value fbk and the determination in step S920 is made negatively (case of "NO"), the process proceeds to step S950. Here, the predetermined value fbk is preset as a value that is slightly smaller than the pressing force by which the interlocking of the ratchet wheel RCH and the hook member TSU may be released.

In step S930, a determination is made according to the control state Sgj on whether or not the control state of the parking brake control is in the release maintaining state. In a case where the control state Sgj indicates the release maintaining state and the determination in step S930 is made affirmatively (case of "YES"), the process proceeds to step S960. On the other hand, in a case where the control state Sgj indicates a state other than the release maintaining state and the determination in step S930 is made negatively (case where it is not in the release maintaining state and "NO" is determined), the process proceeds to step S970.

In step S940, the target pressing force Fbt is restricted to the restriction pressing force (preset predetermined value) fbj. For example, the restriction pressing force fbj may be set to zero. In this case, the target pressing force Fbt is determined as zero even if the instruction pressing force Fbs based on the braking operation amount Bpa is larger than zero, and the amount of electricity to the electric motor MTR is brought to zero (electricity is not applied thereto).

In step S950, the target pressing force Fbt is output as it is. In the case where the target pressing force Fbt is equal to or larger than the predetermined value fbk, probability that the interlock between the ratchet wheel RCH and the hook member TSU is released by the instruction pressing force Fbs is high. As mentioned above, since the driver's braking operation is prioritized, the target pressing force Fbt (=Fbs) is output as it is in the case where the target pressing force Fbt is equal to or larger than the predetermined value fbk.

In step S960, the target pressing force Fbt is output as it is. At this occasion, since the parking brake control is in a non-operating state, the instruction pressing force Fbs (=Fbt) by the service brake control means SBC is output. In step S970, the process of the engagement operation or the process of the release operation is executed according to the control state Sgj.

<Engagement Operation and Electricity Amount Limiting Process of Parking Brake Control>

The engagement operation process and the electricity amount limiting process of the parking brake control will be described with reference to time-series diagrams of FIGS. 10A, 10B (transition diagrams relative to time T). FIG. 10A shows a case where the pressing force Fba is smaller than the lower value fbs (preset predetermined value) when the parking switch PSW (that is, the parking signal Psw) is switched from off (OFF) to on (ON). Further, FIG. 10B shows a case where the pressing force Fba is larger than the upper value fbu (preset predetermined value equal to or larger than the lower value fbs) when the parking switch PSW is switched from off to on.

Firstly, a case where the actual pressing force Fba is smaller than the lower value (preset predetermined threshold) fbs at the time point when the parking switch PSW is turned on will be described with reference to FIG. 10A. At a time point t1, the vehicle is halted, the driver's operation amount Bpa of the braking operation member BP is at a value bpc, and the actual pressing force Fba corresponding to this operation amount bpc is a value fbc which is smaller than the lower value fbs. Then, a state in which the braking operation amount Bpa is at the value bpc is maintained by the driver.

At this time point t1, the driver switches the parking switch PSW from off to on. By this operation, the parking signal Psw is switched from off to on. The control state Sgj of the parking brake is switched from the release maintaining state to the engagement operation state in accordance with the change (transition) in the parking signal Psw. That is, the pressing force adjusting process of the engagement operation is initiated, the parking pressing force Fbp is output at a preset pattern (the increasing gradient kp0 relative to time), the instruction pressing force Fbs and the parking pressing force Fbp are compared, and the larger one of them is determined as the target pressing force Fbt. Due to this, the interference between the service brake control and the parking brake control is prevented.

Specifically, the instruction pressing force Fbs is employed as the target pressing force Fbt from the time point t1 to a time point t2 since the instruction pressing force Fbs according to the operation amount Bpa is larger than the parking pressing force Fbp. Since the parking pressing force Fbp increases as the time T elapses, the parking pressing force Fbp becomes equal to or larger than the instruction pressing force Fbs at the time point t2 and the parking pressing force Fbp is employed as the target pressing force Fbt. At the time point t2 and thereafter, the parking pressing force Fbp is employed as the target pressing force Fbt, and the target pressing force Fbt (which is as a result the actual pressing force Fba) is sequentially increased. Here, the pressing force feedback control performs control so that the target value Fbt and the actual value Fba of the pressing force match each other. Due to this, stable parking brake control without time delay can be executed even if fluctuation occurs in the power transmission efficiency of the braking means BRK.

At a time point t3, when the condition that the actual pressing force Fba is equal to or larger than the lower value fbs (Fba≥fbs) is met, the rotary motion of the ratchet wheel RCH (that is, the electric motor MTR) stops, and thus the target pressing force Fbt is maintained at a constant value ft1. Here, the time point t3 corresponds to the "initiation of the operation of the lock mechanism LOK". At a time point t4 when the halted state of the gear rotation angle Rka is confirmed to have continued over the predetermined time tx1, the electricity application to the solenoid SOL is started to interlock the hook member TSU with the ratchet wheel RCH. The solenoid SOL must press the hook member TSU against the elastic force of the elastic member (return spring)

SPR. Due to this, the hook member TSU is not moved to the ratchet wheel RCH in an instant. In order to ensure the contact between the hook member TSU and the ratchet wheel RCH, the electricity application to the solenoid SOL in the state where the target pressing force Fbt is maintained is continued over the predetermined time tx2. The value of the gear rotation angle Rka in the case where the gear rotation angle Rka maintains its constant state (the gear rotation angle Rka at a time point when the rotation of the ratchet wheel RCH is confirmed to have stopped) is stored (set) as the retention value rk1.

At a time point t5 when the predetermined time tx2 has elapsed, the output of the electric motor MTR is reduced and the ratchet wheel RCH is rotated in reverse in the Rvs direction (the direction along which TSU and RCH further interlock) so as to ensure the interlock between the hook member TSU and the ratchet wheel RCH. Specifically, the target pressing force Fbt starts to be reduced by the reduction value (preset predetermined amount) fbg from the time point t5.

From the time point t5, the change in the gear rotation angle Rka is monitored whether or not it is within a predetermined range. Specifically, the deviation between the retention value rk1 and the gear rotation angle Rka is calculated, and the determination is made on whether or not this deviation is equal to or less than the value (predetermined threshold) hr1. In a case where the state in which the deviation between the gear rotation angle Rka and the retention value rk1 is in the state of being less than the predetermined value hr1 (state of being within the predetermined range) has continued over the predetermined time tx3, the engagement operation state (interlocking process) is completed at a time point t6 and the engagement maintaining state is initiated. That is, the electricity application to the solenoid SOL is stopped at the time point t6 (the instruction signal Scd is changed from the on-state to the off-state) and the parking pressing force Fbp is brought to zero. The gear rotation angle Rka at the time point t6 is stored (set) as the release value rk0.

Figure 9:
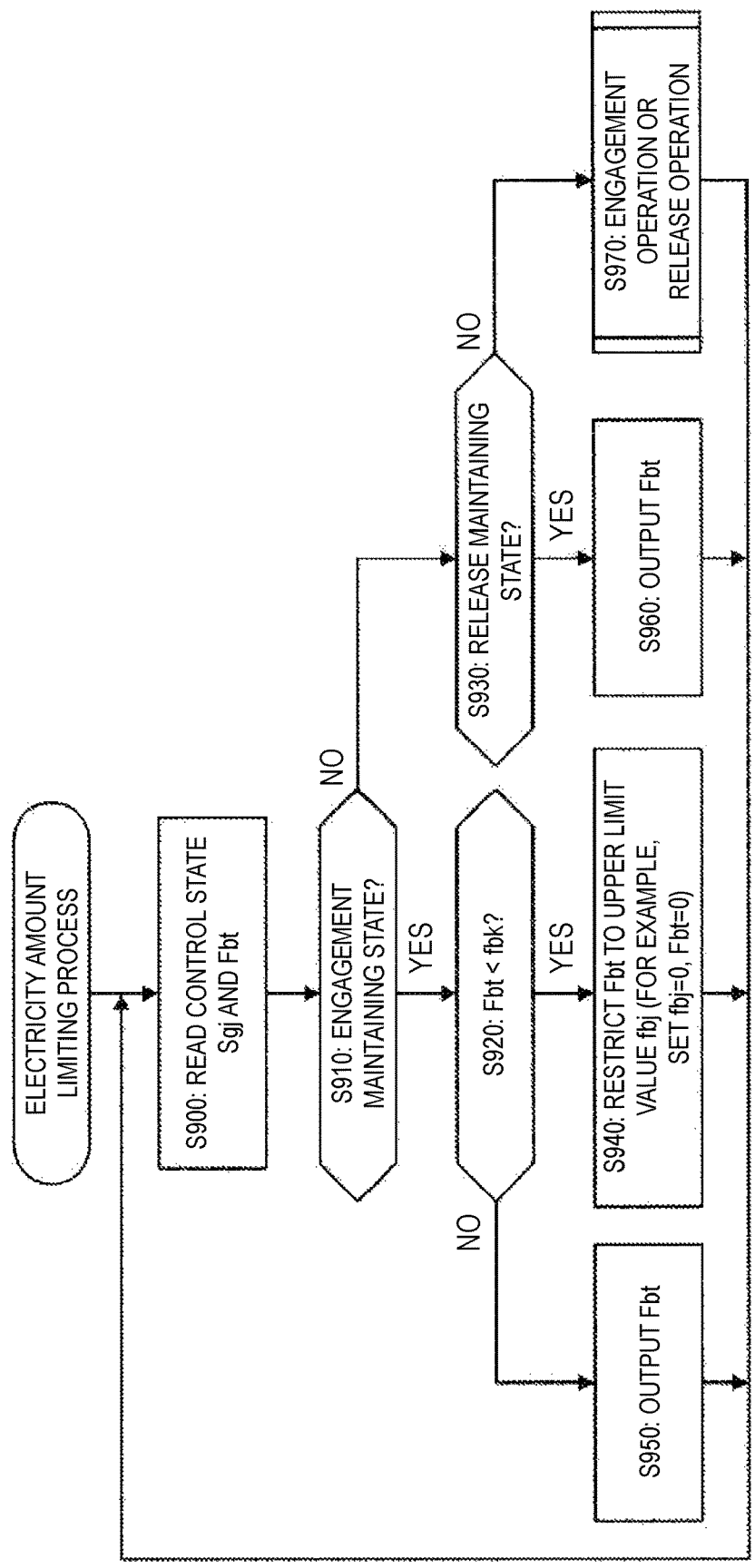
FIG. 9 is a flow diagram for explaining an electricity amount limiting process in the parking brake control.

Since the engagement maintaining state takes place at the time point t6 and thereafter, the electricity amount limiting process is executed (see FIG. 9). Since the braking operation amount Bpa is at the value bpc, the instruction pressing force Fbs corresponding thereto is calculated. However, the target pressing force Fbt is restricted to the restriction value fbj of the pressing force by the electricity amount limiting process. For example, the restriction value fbj may be set to zero. In this case, the target pressing force Fbt is determined to be zero as shown by a broken line at the time point t6 and thereafter, and the electricity application to the electric motor MTR may be stopped (may be brought to the electricity nonapplied state). In the case of the engagement maintaining state, the electricity application to the electric motor MTR is restricted (or set to electricity nonapplied state) by the electricity amount limiting process even if the driver performs a braking operation, and thus the consumed power of the braking means BRK may be reduced.

Next, the case where the pressing force Fba is larger than the upper value fbu (preset predetermined value equal to or larger than the lower value fbs) at the time point when the parking switch PSW is switched from off to on will be described with reference to FIG. 10B. The driver is operating the braking operation member BP strongly at a value bpd, as a result of which the actual pressing force Fba is larger than the upper value fbu.

Similarly to the case of FIG. 10A, the driver switches the parking switch PSW from off to on at a time point u1. By this operation, the parking signal Psw is switched from off to on. The control state Sgj of the parking brake is switched from the release maintaining state to the engagement operation state in accordance with the change (transition) in the parking signal Psw. That is, the pressing force adjusting process of the engagement operation is initiated.

The parking pressing force (target value) Fbp is increased monotonically from the time point u1, but the parking pressing force Fbp is still smaller than the instruction pressing force Fbs. Since the condition "Fba>fbu" is met, the instruction pressing force Fbs according to the operation amount Bpa is employed as the target pressing force Fbt. At the time point u1 and thereafter as well, the target pressing force Fbt does not decrease until the driver reduces the operation amount Bpa of the braking operation member BP. It should be noted that the target value Fbt and the actual value Fba of the pressing force are controlled to match each other by the pressing force feedback control.

At a time point u2, when the driver starts to release the braking operation member BP, the instruction pressing force Fbs (that is, the target pressing force Fbt) decreases as the operation amount Bpa decreases, and the actual pressing force Fba also starts to decrease. When the condition of the actual pressing force Fba being equal to or less than the upper value fbu (Fba<fbu) is met, the target pressing force Fbt is maintained at a constant value ft2 (a value equal to or larger than the upper limit value fbm) to stop the rotary motion of the ratchet wheel RCH (that is, the electric motor MTR). Here, a time point u3 corresponds to the "initiation of the operation of the lock mechanism LOK".

At the time point u3 and thereafter, processes similar to those at the time point t3 and thereafter in the case of FIG. 10A are executed. At a time point u4 when the halted state of the gear rotation angle Rka is confirmed to have continued over the predetermined time tx1, the electricity application to the solenoid SOL is started to interlock the hook member TSU with the ratchet wheel RCH. To ensure that the hook member TSU presses the ratchet wheel RCH, the electricity application to the solenoid SOL in the state of maintaining the target pressing force Fbt is continued over the predetermined time tx2. Here, the value of the gear rotation angle Rka in the case where the gear rotation angle Rka maintains its constant state is stored (set) as the retention value rk1. At a time point t5 when the predetermined time tx2 has elapsed, the electric motor MTR is driven in reverse (rotation in the Rvs direction) so as to ensure the interlock between the hook member TSU and the ratchet wheel RCH. Specifically, at the time point t5, the target pressing force Fbt is decreased by the reduction value (predetermined value) fbg. From the time point u5, when the state in which the deviation between the gear rotation angle Rka and the retention value rk1 is less than the predetermined value hr1 has continued over the predetermined time tx3, the interlocking process in the engagement operation state is completed at a time point u6, the electricity application to the solenoid SOL is stopped, and parking pressing force Fbp is brought to zero. Here, the gear rotation angle Rka at the time point u6 is stored (set) as the release value rk0. As aforementioned, since the engagement maintaining state takes place at the time point u6 and thereafter, the electricity amount limiting process is executed.

Here, in FIGS. 10A and 10B, the time points t1 to t3 and the time points u1 to u3 correspond to the pressing force adjusting process of the engagement operation. Further, the time points t3 to t4 and the time points u3 to u4 correspond to the gear stopping process, the time points t4 to t5 and the time points u4 to u5 correspond to the pawl pressing process, and the time points t5 to t6 and the time points u5 to u6 correspond to the interlock confirming process, respectively. Moreover, the time point t6 and thereafter and the time point u6 and thereafter correspond to the engagement maintaining state. (See FIG. 4 for the above)

As shown in FIG. 10A, at the time point when the parking switch PSW is switched from off to on (in the corresponding calculation cycle, which will be termed a switching time point), in the case where the actual pressing force Fba is smaller than the lower value fbs, the electric motor MTR is driven by the control means CTL until the actual pressing force Fba becomes equal to or larger than the lower value fbs. Then, the operation of the lock mechanism LOK is initiated at the time point when the condition that the actual pressing force Fba is equal to or larger than the lower value fbs is satisfied (calculation cycle).

In the electric braking device DSS which prioritizes the service brake control based on the driver's operation on the braking operation member BP over the parking brake control, when the operation of the lock mechanism LOK is initiated (for example, the ratchet wheel RCH and the hook member TSU are interlocked) at the switching time point in a state where the operation amount Bpa is large and the actual pressing force Fba is excessively large (for example, the case where the actual pressing force Fba is larger than the upper value fbu), the parking brake enters the engagement maintaining state with the excessively large pressing force Fba. When the braking means BRK is designed to address such a situation, an overall size of the device may become large in order to secure strength.

To solve the above problem, as shown in FIG. 10B, in the case where the actual pressing force Fba is larger than the upper value fbu at the switching time point when the parking switch PSW has been switched from off to on (in the calculation cycle in which the switching has taken place), the operation of the lock mechanism LOK is not initiated immediately at the switching time point. The operation of the lock mechanism LOK is initiated after having waited for the driver to reduce the operation amount Bpa of the braking operation member BP and the actual pressing force Fba to become equal to or less than the upper value fbu. According to this, the driver's braking operation is prioritized even in the case where the braking operation member BP is strongly operated, and the parking brake is brought to the engagement maintaining state with an appropriate pressing force (which is a pressing force that is necessary and sufficient to maintain the vehicle's parked state, and is within the range of the predetermined value fbs to value fbu), so that the device can be reduced of its size and weight.

One of the instruction pressing force Fbs and the parking pressing force Fbp having the larger value is determined as the target pressing force Fbt. Further, the electricity amount Imt (which in result is Ima) to the electric motor MTR is adjusted based on the target pressing force Fbt and the actual pressing force Fba so that the actual pressing force Fba matches the target pressing force Fbt. The pressing force corresponding to the amount of electricity to the electric motor MTR would be reduced in the case where the transmission efficiency of the braking means BRK deteriorates; however, the operation and release of the lock mechanism LOK are performed without delay even in such a case, and the driver will not experience discomfort.

Moreover, in the case where the control state of the parking brake is in the engagement maintaining state, the target pressing force Fbt is restricted to the pressing force restriction value (preset predetermined value) fbj. That is, the amount of electricity to the electric motor MTR is restricted during when the lock mechanism LOK is engaged even if the braking operation member BP is operated. For example, the restriction value fbj may be set to zero. In this case, the electricity application to the electric motor MTR is not performed even if the braking operation member BP is operated during when the lock mechanism LOK is engaged. Due to this restriction, the consumed power of the electric braking device DSS may be reduced.

Figure 7:
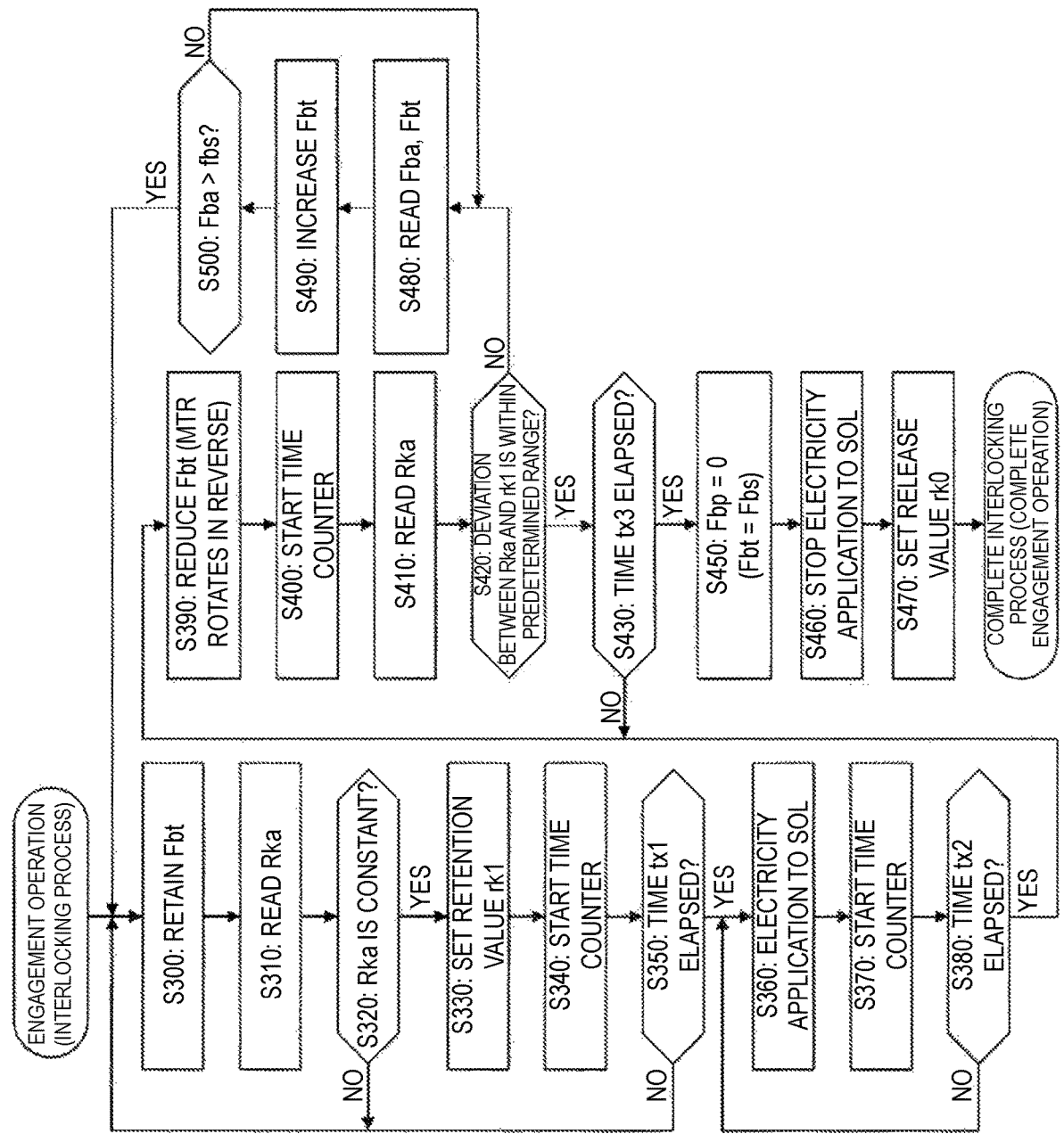
FIG. 7 is a flow diagram for explaining an interlocking process in the engagement operation in the parking brake control.
Figure 8:
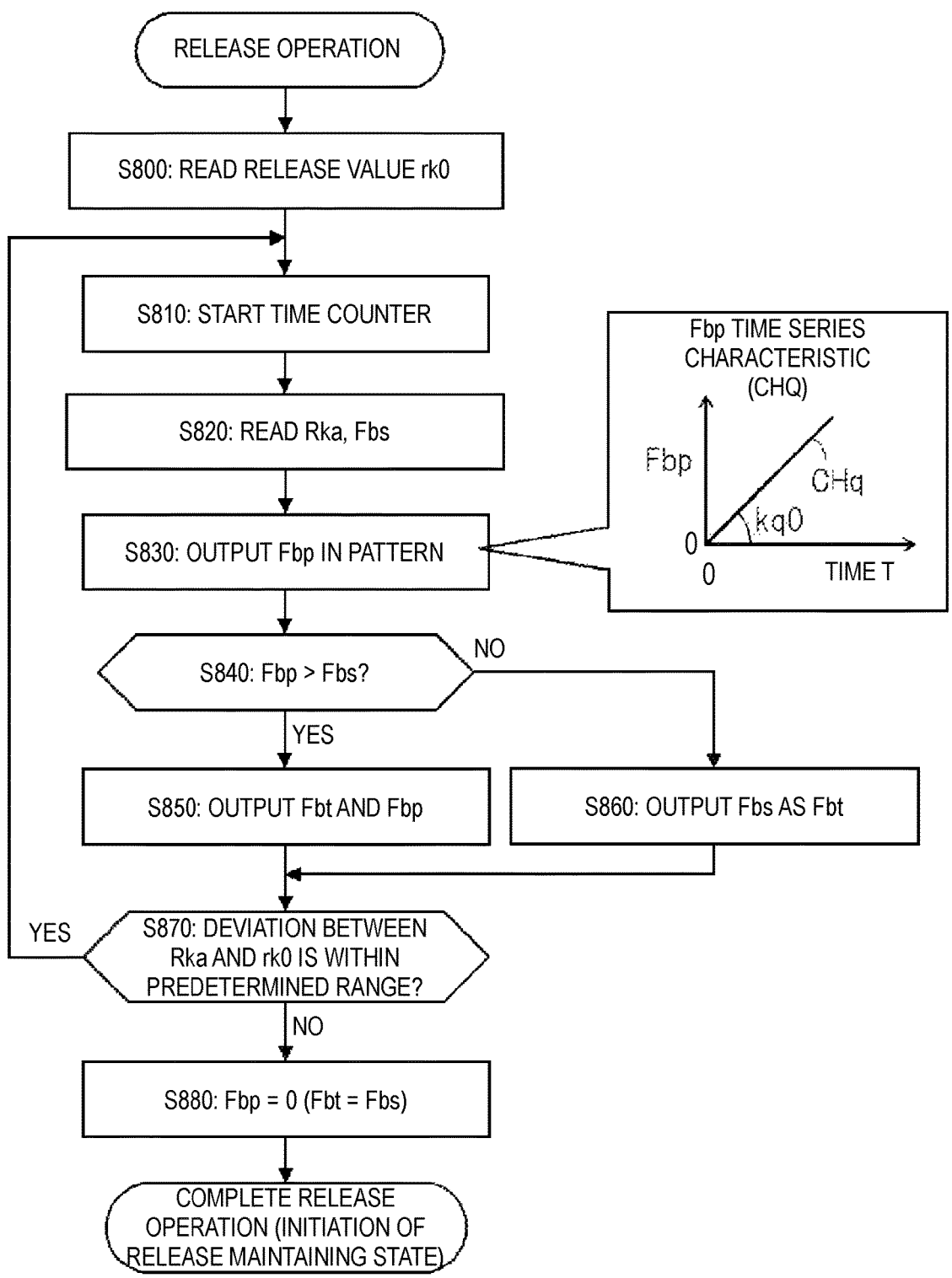
FIG. 8 is a flow diagram for explaining a process of a release operation in the parking brake control.

In the foregoing description, the processes for the engagement operation and the release operation are performed based on the output (gear rotation angle) Rka of the gear rotation angle acquiring means RKA fixed to the ratchet wheel RCH (see FIGS. 7 and 8). Since the ratchet wheel RCH and the electric motor MTR are connected coaxially or via the reduction gear GSK (of which reduction ratio is known), the motor rotation angle acquiring means MKA may be employed as the gear rotation angle acquiring means RKA and the processes for the engagement operation and the release operation may be performed based on the motor rotation angle Mka.

The invention claimed is:

1. An electric braking device for a vehicle, the device comprising:
   an electric motor configured to press a friction member against a rotary member, which rotates integrally with a vehicle wheel of the vehicle, in accordance with an operation amount of a braking operation member by a driver of the vehicle;
   a lock mechanism configured to actuate a parking brake in the vehicle by locking rotation of the electric motor in accordance with a signal of a parking switch operated by the driver of the vehicle;
   a pressing force acquiring means configured to acquire an actual pressing force by which the friction member presses the rotary member; and
   a control means configured to drive the electric motor and the lock mechanism, wherein the control means is configured to:
   calculate an instruction pressing force for the friction member to press the rotary member based on the operation amount;
   calculate a parking pressing force for the friction member supplied to press the rotary member based on a parking signal from the parking switch;
   determine larger one of the instruction pressing force and the parking pressing force as a target pressing force;
   adjust an amount of electricity to the electric motor based on the target pressing force and the actual pressing force such that the actual pressing force matches the target pressing force; and
   control an operation of the lock mechanism based on the actual pressing force.

* * * * *